(12) United States Patent
Kasioumis et al.

(10) Patent No.: US 11,913,795 B2
(45) Date of Patent: Feb. 27, 2024

(54) COMPUTER-IMPLEMENTED METHOD OF PREDICTING ENERGY USE FOR A ROUTE

(71) Applicant: Fujitsu Limited, Kawasaki (JP)

(72) Inventors: Theodoros Kasioumis, Hayes (GB); Hiroya Inakoshi, London (GB); Makiko Hisatomi, Amersham (GB); Sven Van den Berghe, Marlow Bucks (GB)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 17/355,754

(22) Filed: Jun. 23, 2021

(65) Prior Publication Data
US 2022/0026228 A1 Jan. 27, 2022

(30) Foreign Application Priority Data
Jul. 23, 2020 (EP) .................................... 20187503

(51) Int. Cl.
*G01C 21/34* (2006.01)
*G01C 21/28* (2006.01)
(Continued)

(52) U.S. Cl.
CPC ......... *G01C 21/3469* (2013.01); *G01C 21/28* (2013.01); *G06N 3/08* (2013.01); *G06N 5/02* (2013.01); *G06N 20/00* (2019.01)

(58) Field of Classification Search
CPC ................ G01C 21/3469; G01C 21/28; G01C 21/3446; G01C 21/34; G06N 5/02;
(Continued)

(56) References Cited

U.S. PATENT DOCUMENTS 8,346,772 B2 * 1/2013 Bhattacharya ........ G06F 16/355
706/19
2010/0174479 A1 * 7/2010 Golding ............. G01C 21/3484
706/14
(Continued)

FOREIGN PATENT DOCUMENTS

EP 2690408 1/2014
EP 3767236 A1 * 1/2021 ......... B60R 16/0236

OTHER PUBLICATIONS

P. Kosmides, L. Lambrinos, V. Asthenopoulos, K. Demestichas and E. Adamopoulou, "A clustering based approach for energy efficient routing," 2016 IEEE Symposium on Computers and Communication (ISCC), Messina, Italy, 2016, pp. 232-237, doi: 10.1109/ISCC.2016.7543745. (Year: 2016).*

(Continued)

*Primary Examiner* — Rachid Bendidi
*Assistant Examiner* — Dana F Artimez
(74) *Attorney, Agent, or Firm* — STAAS & HALSEY LLP

(57) ABSTRACT

A computer-implemented method of predicting energy use for a route including inputting map data of roads included in K trips in a geographical area, predictors of rate of energy use along the roads, and energy consumption data of the K trips. The method includes dividing each of the roads in the map data for all the trips into segments of length measure $\lambda_i$; grouping the segments from the trips into a number N of clusters, using an algorithm to build a model predicting the weights $W_j$ based on solving a system of equations, one per trip, assigning the predicted weight applied to the cluster in which the segment was grouped and storing a segment ID with the corresponding cluster ID or predicted rate of energy use $Y_i$ to allow prediction of energy use for a route in the (Continued)

geographical area incorporating one or more of the segments.

15 Claims, 8 Drawing Sheets

(51) Int. Cl.
  *G06N 5/02* (2023.01)
  *G06N 3/08* (2023.01)
  *G06N 20/00* (2019.01)
(58) Field of Classification Search
  CPC . G06N 3/04; G06N 3/08; G06N 20/00; G06F 17/00
  See application file for complete search history.

(56) References Cited

U.S. PATENT DOCUMENTS

| | | | |
|---|---|---|---|
| 2011/0205359 A1* | 8/2011 | Lee | G08B 13/19676 348/143 |
| 2012/0232783 A1 | 9/2012 | Calkins et al. | |
| 2019/0113354 A1* | 4/2019 | Matsumura | G01C 21/3469 |
| 2019/0114909 A1* | 4/2019 | Halama | G08G 1/052 |
| 2019/0129410 A1 | 5/2019 | Cella et al. | |
| 2020/0149914 A1 | 5/2020 | Panahandeh et al. | |
| 2020/0151291 A1 | 5/2020 | Bhattacharyya et al. | |
| 2020/0158526 A1 | 5/2020 | Mckenna et al. | |
| 2020/0372418 A1* | 11/2020 | Hirose | H04W 4/029 |

OTHER PUBLICATIONS

Extended European Search Report dated Nov. 13, 2020 in European Patent Application No. 20187509.3.
Rodolfo I. Meneguette et al., "Intelligent Transport System in Smart Cities: Aspects and Challenges of Vehicular Networks and Cloud", Sep. 2018, XP855743957, 8 pages.
Fred Lambert: "Tesla is now using more sophisticated algorithm with temperature to better predict range", Jan. 2019, XP855743955, 3 pages.
Afiya Ayman, et al., "Data-Driven Prediction of Route-Level Energy Use for Mixed-Vehicle Transit Fleets", arxiv.org, Cornell University Library, Apr. 2020, XP881643384, 9 pages.
Fatemeh Saremi, et al., "Experiences with GreenGPS-Fuel-Efficient Navigation Using Participatory Sensing", IEEE Transactions on Mobile Computing, vol. 15, No. 3, Mar. 2016, 18 pages.
Afonso Vilaça Bastos Silva, "Estimating Fuel Consumption from GPS Data", Oct. 2014, XP855743782, 106 pages.
Extended European Search Report dated Jan. 28, 2021 in European Patent Application No. 20187503.6.
Jacob Holden et al., "Trip Energy Estimation Methodology and Model Based on Real-World Driving Data for Green Routing Applications", Conference Paper, NREL/CP-5400-70512 , Feb. 2018, 11 pages.
Cedric De Cauwer et al., "A Data-Driven Method for Energy Consumption Prediction and Energy-Efficient Routing of Electric Vehicles in Real-World Conditions", Energies 2017, doi:10.3390/en10050608, 18 pages.
Lennon Rodgers et al., "Estimating an Electric Vehicle's "Distance to Empty" Using Both Past and Future Route Information", Paper No. DETCZ013-12880, V001T01A004; Published Online Feb. 12, 2014, 9 pages.
Shuai Sun et al., "A Machine Learning Method for Predicting Driving Range of Battery Electric Vehicles", Hindawi Journal of Advanced Transportation, vol. 2019, Article ID 4109148, 15 pages.
Chenglin Liu et al., "An Energy-Efficient Dynamic Route Optimization Algorithm for Connected and Automated Vehicles Using Velocity-Space-Time Networks", publication date Aug. 6, 2019, 12 pages.

\* cited by examiner

| Gradient | <-0.25 | <-0.12 | <-0.05 | <0 | <0.05 | <0.12 | <0.25 | >=0.25 |
|---|---|---|---|---|---|---|---|---|
| Weights | | | | | | | | |

COMPUTER-IMPLEMENTED METHOD OF PREDICTING ENERGY USE FOR A ROUTE

CROSS-REFERENCE TO RELATED APPLICATION(S)

This application is based on and hereby claims priority to European Patent Application No. 20187503.6, filed Jul. 23, 2020, in the European Intellectual Property Office, the disclosure of which is incorporated herein by reference.

FIELD

The present invention relates to predicting the effect of individual components on an aggregated statistic (a statistic that is the sum of other random variables). In particular it may relate to predicting the effect of each segment of a trip on the total energy consumption of an electric vehicle. The present invention may further relate to energy efficient route optimization by applying a route optimization algorithm after the estimation of energy consumption for each segment of the trip, such as a road segment.

BACKGROUND

One of biggest barriers to the large-scale adoption of electric vehicles (EV) is driving range anxiety. Despite the recent improvements in battery technology and the increasingly wide distribution of charging stations many consumers fear that they may be left stranded by an exhausted battery due to miscalculation of their remaining driving range.

The reason for this anxiety is that the energy consumption of an electric vehicle is dependent on many factors, so the energy consumed during the same journey or the same car may be unpredictable. These factors include, for example, any relevant parameters such as driving style (passive or aggressive), condition of the vehicle, mood of driver (for instance, if a driver's mood on a particular day causes their driving style to deviate from their usual driving style), weather conditions, road properties, traffic and unexpected events taking place during the journey. This lack of predictability is aggravated by errors and noise in the measurement of important features like battery capacity and acceleration.

Many attempts have been made in the prior art to diminish the range anxiety effect. The most notable energy consumption estimation models rely on time series data linked to each road segment and a ground truth value for the energy consumption at link level, that is for each road segment. This is referred to as link level ground truth, and ground truth is used herein to denote empirical as opposed to derived measurement/values or known values. GPS loggers have been used to link data to road segments in order to predict energy consumption for those segments. Such data though may be expensive to obtain and when acquired they require a lot of pre-processing time before use in modelling.

Training machine learning models for accurate prediction of the energy consumption in a supervised fashion relies on link level ground truth values for the energy consumption of each road segment. The same is true of other models.

SUMMARY

According to an embodiment, a computer-implemented method of predicting energy use for a route comprises inputting map data of roads included in K trips in a geographical area, and inputting predictors of rate of energy use along the roads; inputting energy consumption data of the K trips, the energy consumption data indicating total energy use T between a start point A and an end point B of each of the K trips; and dividing each of the roads in the map data for all the K trips into segments of length measure $\lambda_i$.

The method includes grouping the segments from the K trips into a number N of clusters, the clusters being defined in accordance with ranges of at least one of the predictors and each cluster being defined as having a weight $W_j$ which is to be determined; using an algorithm to build a model predicting the weight $W_j$ based on solving a system of equations, one per trip, each equation equating a known total energy use T of a trip with a sum of a known length measure of each segment in the trip multiplied by a weight for a cluster into which a segment was grouped; for each segment, assigning the predicted weight $W_j$ applied to the cluster in which the segment was grouped as a predicted rate of energy use $Y_i$; and storing a segment identifier (ID) with an indication of the predicted rate of energy use $Y_i$ to allow prediction of energy use for a route in the geographical area incorporating one or more of the segments. The computer-implemented method according to an embodiment includes, before the inputting of the map data, for each trip in a database, finding a shortest route between the start point A and the end point B; checking a length in the database between start point A and end point B; and including data of the shortest route for a trip when the length is within a threshold of the shortest route between A and B to form the K trips.

A computer-implemented method according to an embodiment includes, executing data cleaning before the inputting of the map data.

The data cleaning according to an embodiment includes, smoothing elevation data on elevation tiles by, when there is more than one point on a tile, changing an elevation of one or more edge points on the tile adjacent to a tile of a different elevation to move the elevation of the edge points closer to the elevation of the tile of the different elevation.

The method according to an embodiment includes, is extended to include all the segments in the geographical area by: dividing parts of the roads in the geographical area which are not included in the K trips into untraveled segments; grouping any untraveled segment into a cluster in accordance with a level of at least one of the predictors in that untraveled segment; and using the predicted rate of energy use and length of measure of each untraveled segment to allow prediction of energy use for a route also incorporating one or more of the untraveled segments.

According to an embodiment, the predictors include at least one of: gradients in the segments, such as an average positive or negative gradient of the segment; and traffic-affecting features in the segments, such as historical traffic data, traffic signals, junctions, and shops.

According to an embodiment, the clusters are defined in accordance with ranges of one or more predictors providing a predictor space of a number of dimensions equal to a number of predictors, the predictor space providing one axis for each predictor, a predictor having a greater effect on the energy use preferably being divided into more cluster divisions than a predictor having a lesser effect on the energy use.

According to an embodiment, the method comprises, for each dimension, ordering the division of the cluster so that a division representing a level of predictor having a lower effect on energy consumption is provided in a lower division and/or at a lower position along the one axis for that predictor than a division representing a level of predictor having a higher effect on energy consumption, and $W_j$ has a lower value than $W_{j+1}$.

According to an embodiment, a number of segments of road in the geographical area M is at least one order of magnitude greater than the number N of clusters and/or a number of trips K.

According to an embodiment, the algorithm to build the model is a quadratic optimization algorithm or developed by a neural network.

According to an embodiment, the algorithm is a quadratic optimization algorithm, which is constrained using constraints for weights, the weights being constrained according to the clusters, and ordered according to the impact that each predictor has on the energy consumption rate.

According to an embodiment, a computer-implemented method for route optimisation is provided comprising using predicted energy use for possible routes in the geographical area between the start point and the end point calculated and indicating to a user relative energy use of the possible routes by indicating a lowest-energy route.

According to an embodiment, a computer program comprising instructions which, when the computer program is executed by a computer, cause the computer to carry out a computer-implemented method of predicting energy use for a route is provided. The method includes inputting map data of roads included in K trips in a geographical area, and inputting predictors of rate of energy use along the roads; inputting energy consumption data of the K trips, the energy consumption data indicating total energy use T between a start point A and an end point B of each of the K trips; and dividing each of the roads in the map data for all the K trips into segments of length measure $\lambda_i$.

According to an embodiment, the method includes grouping the segments from the K trips into a number N of clusters, the clusters being defined in accordance with ranges of at least one of the predictors and each cluster being defined as having a weight $W_j$ which is to be determined; using an algorithm to build a model predicting the weight $W_j$ based on solving a system of equations, one per trip, each equation equating a known total energy use T of a trip with a sum of a known length measure of each segment in the trip multiplied by a weight for the cluster into which a segment was grouped; for each segment, assigning the predicted weight $W_j$ applied to the cluster in which the segment was grouped as a predicted rate of energy use $Y_i$; and storing a segment ID with an indication of the predicted rate of energy use $Y_i$ to allow prediction of energy use for a route in the geographical area incorporating one or more of the segments.

According to an embodiment, a data processing apparatus comprising a processor and memory configured to carry out a method of predicting energy use for a route is provided.

According to an embodiment, a computer-implemented method of estimating individual components that contribute to an aggregated statistic is provided. The method comprises inputting data in K trials, and inputting predictors of overall rate of contribution to the aggregated statistic; inputting contribution data of the K trials, the contribution data indicating total contribution T between a start and an end of each of the K trials; dividing the each of the K trials into time or space segments of length measure $\lambda_i$; and grouping the segments from the K trials into a number N of clusters, the clusters being defined in accordance with ranges of at least one of the predictors, each cluster being defined as having a weight $W_j$ which is to be determined.

According to an embodiment, the method includes using an algorithm to build a model predicting the weight $W_j$ based on solving a system of equations, one per trial, each equation equating a known total contribution T of a trial with a sum of a known length measure of each segment in the trial multiplied by the weight for a cluster into which the segment was grouped; for each segment, assigning the predicted weight applied to the cluster in which the segment was grouped as a predicted rate of contribution $Y_i$; and storing a segment ID with an indication of the predicted rate of contribution $Y_i$ to allow prediction of contribution for an aggregated statistic incorporating one or more of the segments

BRIEF DESCRIPTION OF THE DRAWINGS

These and/or other aspects and advantages will become apparent and more readily appreciated from the following description of the embodiments, taken in conjunction with the accompanying drawings. Features of the present invention will now be described, purely by way of example, with references to the accompanying drawings, in which:

FIG. 9 is a table of constraint ranges in one-dimensional predictor space according to an embodiment;

FIG. 10 is a table of constraint ranges in two-dimensional predictor space according to an embodiment;

FIG. 11 is a table of segments and predictors applied to them according to an embodiment;

DETAILED DESCRIPTION

Figure 1:
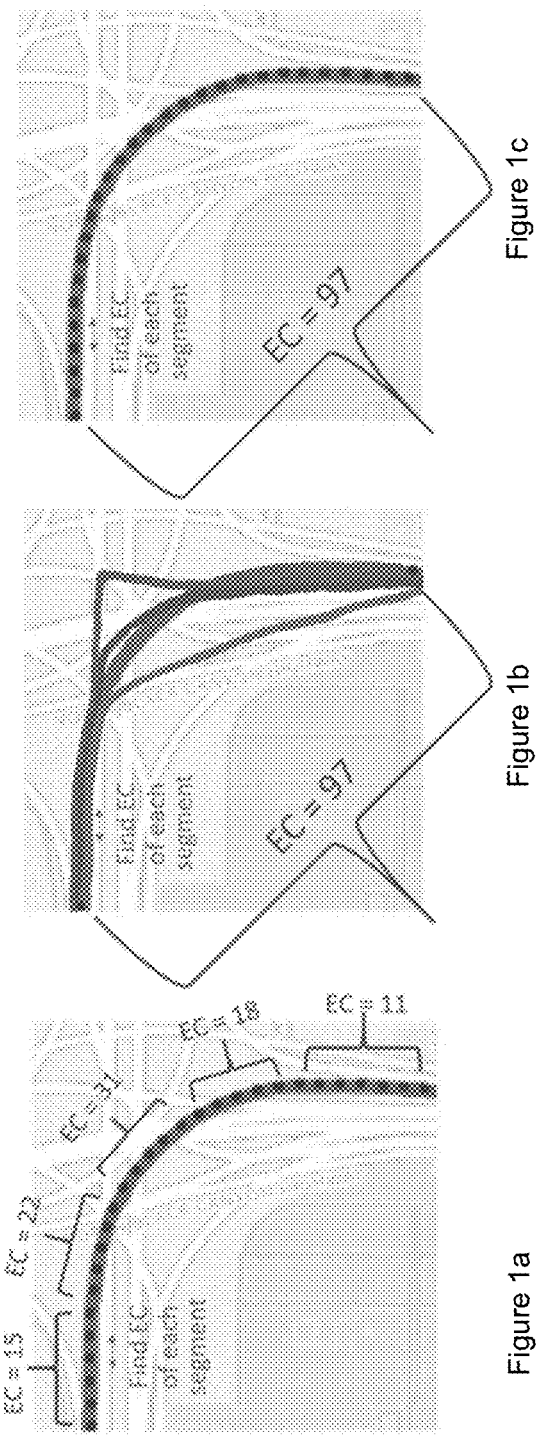
FIGS. 1a, 1b and 1c are overview diagrams comparing a prior art technique with the new method.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The inventors have realised that it would be advantageous to overcome the challenge of predicting the energy consumption of a road segment without a link level ground truth value.

Thus, they have come to the realisation that is desirable to provide a modelling technique for estimating the energy consumption for each segment from aggregated trip data, without link level ground truth value for energy consumption at intermediate points on the trip. More generally, it is desirable to predict an aggregated statistic (for example in any of the fields of energy consumption, finance, production management or anomaly detection) based on the effect of modelled individual constituents, but without knowledge of the contribution of the individual constituents.

According to an embodiment of a first aspect of the invention, there is provided a computer-implemented method of predicting energy use for a route. The terms "road", "vehicle" and "route" are used herein generally, so that a vehicle may be a car, lorry, bus, motorcycle travelling along a road, or any vehicle travelling along tracks or other paths which uses energy to travel.

The energy use may be for a standard or average vehicle or may be adjusted for a particular vehicle, after or during the method. Equally the energy use may be adjusted for a predicted speed or be based on a standardised or average speed.

In a first phase, a model is built. There are two types of input: map data and energy consumption data, which may be in parallel or consecutive, in either order. The method may comprise inputting map data of roads included in a plurality of trips, or K trips, in a geographical area, and inputting predictors of rate of energy use along the roads. The method may also comprise inputting (vehicle) energy consumption data of the K trips, the energy consumption data indicating total energy use or consumption T between the start point A and end point B of each trip, measured for example as a power in Watts or as a rate per kilometre in Wh/km. This latter data may be averaged across a range of vehicles or standardised, for example set by a certain vehicle. The roads in the map data may be divided into segments of (usually fractional but potentially a real value of) length measure $\lambda_i$, which may be of different individual length measures. For example, Ai may be the i-th segment length divided by the total length of the trip, that is, a number in the interval [0, 1]. The segments from the trips may be grouped into a number N of clusters. Here, the clusters may be defined in accordance with ranges of at least one of the predictors, each cluster being defined as having a weight $W_j$ which is to be determined.

The method may then use an algorithm to build a model predicting the weights $W_j$ based on solving a system of equations, one per trip, each equation equating the known total energy consumption T of the trip with the sum of the known length measure of each segment in the trip multiplied by the weight for the cluster into which the segment was grouped. For each segment, the method may assign the predicted weight applied to the cluster in which the segment was grouped as the predicted rate of energy use $Y_i$; and store a segment ID with an indication of the predicted rate of energy use $Y_i$ (such as the corresponding cluster ID or predicted total energy use of the segment or predicted rate of energy use $Y_i$). This allows prediction of energy use for a route in the geographical area incorporating one or more of the segments. The last step may be in a querying phase, which queries the model to retrieve information relating each segment to a rate of use of energy. Simple addition of this information for each segment (potentially scaled up or down according to a particular vehicle and/or predicted speed) will provide an idea of the energy use of the route. The prediction of energy use may be comparative (not adapted for a specific vehicle)—for example to select a route from potential routes between a start and end point, based on energy consumption.

Optional pre-processing may comprise, before inputting the map data, for each trip in a database, finding the shortest route between start point A and end point B; checking the length in the database between start point A and end point B; and including the shortest route data for a trip if its length is within a threshold of the shortest route between A and B to form the K trips. The threshold may be expressed in an absolute length or a percentage deviation for example. The percentage deviation may be 10%, more preferably between 1 and 5%, most preferably 2%.

Optional pre-processing may comprise, before inputting the map data, data cleaning preferably comprising smoothing elevation data on elevation tiles by, when there is more than one point on a tile, changing the elevation of one or more edge points on the tile adjacent to a tile of a different elevation to move the elevation of the edge points closer to the elevation of the tile of the different elevation. That is, the pre-processing may linearly interpolate the elevation of intermediate points taking into account the elevation of points lying in different elevation tiles.

The method may be extended to include all the segments in the geographical area by: dividing the parts of the roads in the geographical area which are not included in the trips into untraveled segments; grouping any untraveled segment into a cluster in accordance with the level of at least one of the predictors in that untraveled segment; and using the predicted rate of energy use and length measure of each untraveled segment to predict energy use for a route also incorporating one or more of the untraveled segments. Hence the same method is used as for the previous (untraveled) segments in the model, to group a segment into a cluster once the model has been created. Hence the method may cover all the routes on a map, whether or not they form part of one of the trips that are used to build the model.

Any suitable predictors may be used. For example, the predictors may include at least one of: gradients in the segments, such as an average positive or negative gradient of the segment; and traffic-affecting features in the segments, such as historical traffic data, traffic signals, junctions and shops, types of road, meteorological temperature, vehicle speed, and/or wind effects. The gradients, traffic signals, shops and types of road may be derived from map data (effectively geographical data, which may be, but is not necessarily the same as the map data containing the roads). The remaining data such as meteorological temperature and vehicle speed and/or wind effects may be input together with the energy consumption data related to the trips. For instance, wind direction in a geographic area may be queried from open-source data suppliers before travel begins and ambient temperature may be obtained from meteorological data for that day. Regarding the speed, the history of the particular driver as well as past historical traffic data (if available) may be taken into account; if no history is available then the method may use a nominal speed value for each road segment provided with the energy consumption data. Other vehicle data, such as battery temperature, may be acquired from the vehicle and/or the energy consumption data.

Clustering is an important part of the method. Preferably, the clusters are defined in accordance with ranges of one or more predictors providing a predictor space of a number of dimensions equal to the number of predictors. For example, two major predictors which may be used together in a two-dimensional predictor space are gradient and a number of shops, or gradient and traffic signals. The predictor space may provide, for example, one axis for each predictor. A predictor having a greater effect on the energy use is preferably divided into more cluster divisions than a predictor having a lesser effect on the energy use.

The method may include, for each dimension, ordering the division of the cluster so that a division representing a level of predictor having a lower effect on energy consumption is provided in a lower division (and/or at a lower position along the axis for that predictor) than a division representing a level of predictor having a higher effect on energy consumption, and $W_j$ has a lower value than $W_{j+1}$. This gives a natural and readily understandable grouping into clusters.

The method is particularly advantageous if the number of segments of road in the geographical area M is at least one order of magnitude greater than the number N of clusters and/or the number of trips K.

Any suitable algorithm may be used to predict cluster weights and thus build the model. In examples, the algorithm to build the model may be a quadratic optimization algorithm or developed by a neural network.

Where the algorithm is a quadratic optimization algorithm, it may be constrained using constraints for the weights. In this case the weights may be constrained according to the clusters to which they are assigned (with a larger weight for a higher cluster), and thus ordered according to the impact that each predictor has on the energy consumption rate.

The same trip in the energy consumption data from A to B may have different values according to the driving behaviour/mood of the driver, traffic conditions that day, weather etc. Therefore the same trip may be related with different values and the energy consumption rates are not averaged over the trips (the predictors of course will take different values). An energy consumption rate (per kilometre, for example, so over a distance) may be obtained from the energy consumption data or used in place of this value if the length measure is given as a fraction of the total length).

A computer-implemented method for route optimisation may comprise using predicted energy use for possible routes in the geographical area between a start point and an end point as calculated according to any of the preceding definitions and indicating to the user the relative energy use of the possible routes, for example by indicating the lowest-energy route. The recommended route may be fed to a navigation aid for the user.

According to an embodiment of a second aspect of the invention, there is provided a computer program comprising instructions which, when the program is executed by a computer, cause the computer to carry out the method as described above.

The program may execute locally or on the cloud to provide the energy use prediction method at a local device.

According to an embodiment of a third aspect of the invention, there is provided a computer (data processing apparatus) comprising a processor and memory configured to carry out the method of any of the preceding claims. The processor and memory may be linked to a display (for example displaying input fields and results) and to an input device (for a developer to build to input data and parameters to build the model of energy usage and/or for the end user to indicate the start and end of a route).

A corresponding computer system may comprise the computer as defined above, a display, and an input device and any other required components, such as a network interface.

Finally, in a generalised aspect, there is provided a computer-implemented method of estimating individual components that contribute to an aggregated statistic: inputting data in K trials, and inputting predictors of overall rate of contribution to the aggregated statistic; inputting contribution data of the K trials, the contribution data indicating total contribution T between the start and end of each trial; dividing the each of the trials into time or space segments of (fractional) length measure $\lambda_i$; grouping the segments from the trials into a number N of clusters, the clusters defined in accordance with ranges of at least one of the predictors, each cluster being defined as having a weight $W_j$ which is to be determined; using an algorithm to build a model predicting the weights W; based on solving a system of equations, one per trial, each equation equating the known total contribution T of the trial with the sum of the known length measure of each segment in the trial multiplied by the weight for the cluster into which the segment was grouped; for each segment, assigning the predicted weight applied to the cluster in which the segment was grouped as the predicted rate of contribution $Y_i$; and storing a segment ID with the corresponding cluster ID or predicted rate of contribution $Y_i$ to allow prediction of contribution for an aggregated statistic incorporating one or more of the segments.

An apparatus (computer or computer system) or computer program according to preferred embodiments of the present invention may comprise any combination of the method aspects. Equally, the features of the energy use aspect may be applied to the generalised aspect unless clearly incompatible. Methods or computer programs according to further embodiments may be described as computer-implemented in that they require processing and memory capability.

The apparatus according to preferred embodiments may be described as configured or arranged to, or simply "to" carry out certain functions. This configuration or arrangement could be by use of hardware or middleware or any other suitable system. In preferred embodiments, the configuration or arrangement is by software.

The invention may be implemented in digital electronic circuitry, or in computer hardware, firmware, software, or in combinations of them. The invention may be implemented as a computer program or computer program product, i.e., a computer program with instructions tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results. Multiple test script versions may be edited and invoked as a unit without using object-oriented programming technology; for example, the elements of a script object may be organized in a structured database or a file system, and the operations described as being performed by the script object may be performed by a test control program.

Elements of the invention may be described using the terms "processor", "input device" etc. The skilled person will appreciate that such functional terms and their equivalents may refer to parts of the system that are spatially separate but combine to serve the function defined. Equally, the same physical parts of the system may provide two or more of the functions defined.

For example, any separately defined means may be implemented using the same memory and/or processor as appropriate.

STATE OF THE ART

Many papers in literature are devoted to the problem of energy efficient route estimation for electric vehicles. For prior-art accurate energy consumption estimation is essential to acquire motor and driver information as well as a link level ground truth value for energy consumption at intermediate locations during a trip. This is because over-aggregation of information causes loss of variability in the data, making it very difficult to estimate the contribution of each individual constituent segment to the energy consumption in a trip. Moreover, it is widely known that the speed and acceleration of the vehicle highly affects the energy consumption. That is why most accurate prior-art modelling try to infer the speed profile of the driver relying on time series data linked to each road segment.

Sensors to link data to each road segment include GPS loggers with 1-Hz up to 10-Hz frequency used for identifying longitude/latitude coordinates and instantaneous speed. Then, acceleration estimates may be obtained using finite differences between speed values divided by the distance travelled. It is clear that having accuracy in GPS coordinates results in higher accuracy in estimating speed/acceleration and hence energy consumption. Moreover, sensors for battery state, cell voltage and deterioration rate could help to determine anomalies that may drastically alter the energy consumption during a trip. Last by not least, on-the-fly information about the traffic conditions and weather (temperature, wind, precipitation) make it possible for driver behaviour estimation (speed profile) and auxiliary consumption estimation to be carried out, which is important because they may have a huge impact on energy consumption.

There exists a plethora of novel techniques for estimating energy consumption of an electric vehicle (such as a car, lorry, van, motorhome, or even a boat or train or other electrically powered or hybrid vehicle which does not travel on a road). Such techniques include regressors such as multi linear regression, support vector regressors, gradient boosting etc. as well as Markov chains, physical models, combination of neural networks with physical models, reinforcement learning, and many others.

To train a machine learning model to predict energy consumption for each road segment in a supervised fashion it has been seen as essential to acquire a ground truth value for the energy consumption at intermediate locations of a trip as well as motor and driver data. However, such detailed information may be difficult or expensive to obtain and also when acquired it requires a lot of pre-processing time.

FIG. 1a shows the curve of a road. The points along the curve represent data provided by a GPS logger that may measure location and instantaneous speed. In this prior art example, intermediate ground truth values (link level ground truth, that is, for the links or segments between each logged point) for energy consumption make it easier to infer the energy consumption for that road link or segment.

Invention embodiments do not have the GPS information at intermediate locations. This scenario is represented in FIG. 1b. Because of this, the path followed by the Electric Vehicle (EV) is uncertain. Moreover, only the total energy consumption (EC) is known for each trip. FIG. 1b shows different paths joining the beginning and the end of the road curve. To counter this difficulty, in invention embodiments, paths whose mileage is more than a certain percentage, such as 1-5%, preferably 2%, different from the shortest path joining the start and end point are not considered. That is, data from these paths is not included in the method, because it is unlikely that these paths follow the shortest route which is taken in the method to be the route of the EV.

FIG. 1c, again shows dots, which are added in the method to delimit the road segments. Open source route optimization software such as OSRM (Open Source Routing Machine) or GraphHopper may be used to divide a trip into road segments (a map may be considered as a graph and a road trip as a path linking nodes of the graph; the road segments are links between adjacent nodes). Inferring the energy consumption of each road segment from aggregated driving information (e.g. average speed, no acceleration information) and without a link level ground truth value for energy is much more difficult and challenging. This is because over-aggregation of information causes loss of variability in the data, making it very difficult to estimate the contribution of each individual constituent segment to the energy consumption in a trip. For example, in a case with just two road segments with ECRs of 200 Wh/km and 250 Wh/km, respectively, the average ECR is 225 Wh/Km, which is not a bad estimate for each road segment—there is only a small amount of information lost. Conversely, in a case with twenty road segments, of wildly varying road gradients (both positive and negative): the ECRs will vary wildly also (e.g. 200 Wh/km, 70 Wh/km, −90 Wh/km, . . . ). The average ECR may be 60 Wh/km, which is a bad estimate for each road segment due to over aggregation. Invention embodiments solve these issues (and equivalent general issues in modelling of aggregated data) as explained in more detail below.

Of course, the standard energy prediction may be modified for a specific car and take account of specific driving conditions. In the modelling phase, the manufacturer's data for energy consumption may include a single type of vehicle and overall speed. In the routing engine. Looking forward to comparing different driving routes, the routing engine however need not rely on such data (speed, wind, driving style etc.) The most energy efficient path does not change with these predictors, for example if there is more wind, or the speed is different. The most energy efficient path should be the same in all situations.

In contrast, to determine EV range, more data is required. The methods can use two different models. The first model uses only gradient, traffic data, shops etc. to make a model for the routing engine in order to find the most energy efficient route. The second model is used for accurate ECR estimation of the most energy efficient route After finding the most energy efficient route using the first model, two questions arise:
A) How much energy it will use, depending on the driving style, weather, speed etc? In order to perform accurate estimation more predictors (speed, temperature, wind etc.) are used to build a second model from manufacturer's data. The predictors are quantized or clustered to solve a system of equations to infer a value for each cluster.
B) Is there enough energy to perform this path? If not, the EV must re-route to the closest charging station i.e., the method may find the most energy efficient path to the closest charging point and then re-route again after charging.

Figure 2:
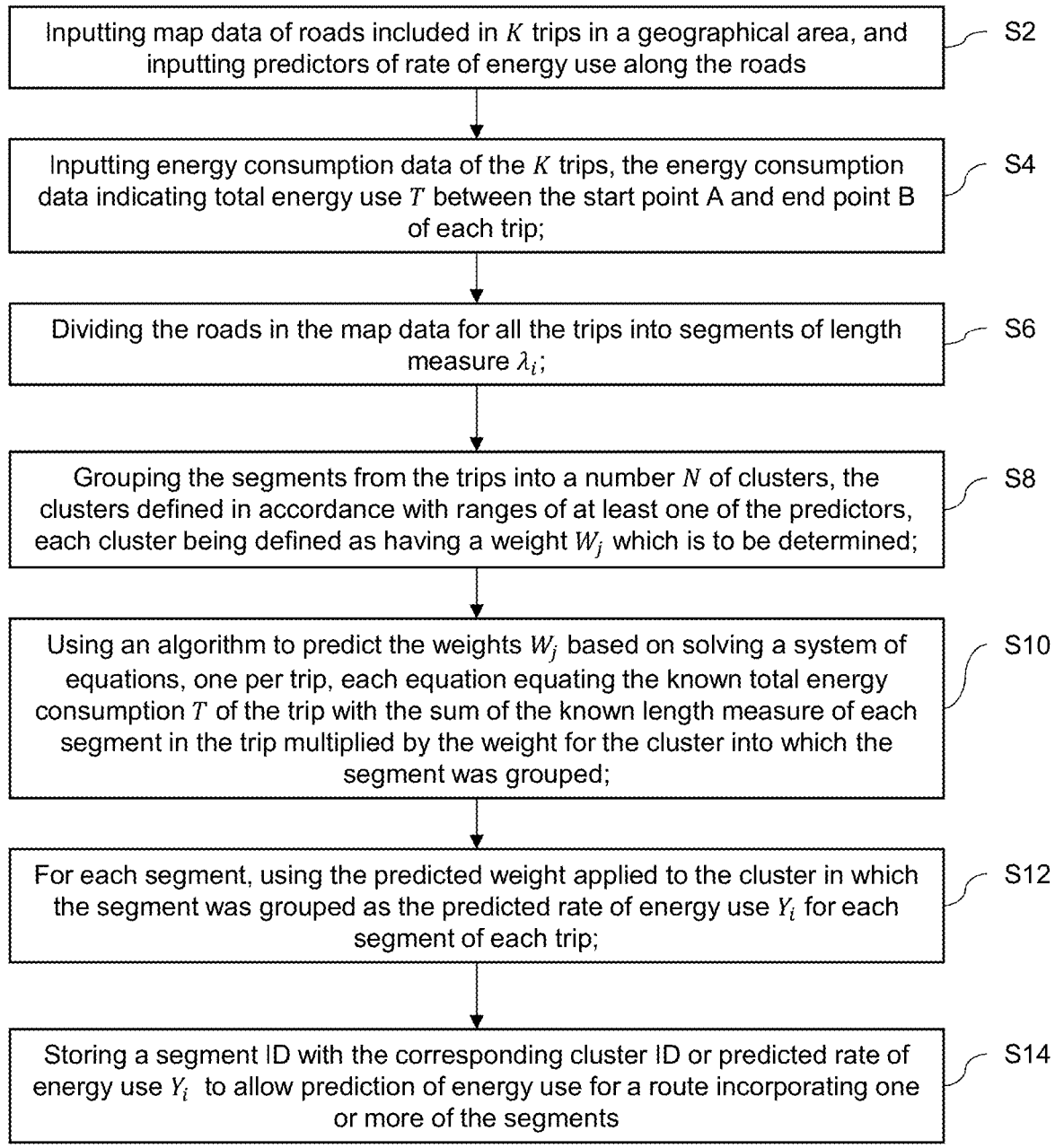
FIG. 2 is a flow chart of a method according to an embodiment.

FIG. 2 is a flowchart illustrating a general embodiment of the invention.

Operation S2 involves inputting map data of roads included in K trips in a geographical area, and inputting predictors of rate of energy use along the roads. Some predictors of energy usage may be geographical or map data, such as gradient.

Operation S4 comprises inputting energy consumption data of the K trips, the energy consumption data indicating total energy use T between the start point A and end point B of each trip. The energy consumption data may be provided in a vehicle dataset with empirical data of specific vehicle trips, for example giving start and end points of the trips and mileage, which is matched to the map data to derive the roads used, as well as optionally average speed (another predictor) and other relevant factors.

In operation S6, each of the roads in the map data for all the trips is divided into segments of length measure $\lambda_i$.

In operation S8, the segments from the trips are grouped into a number N of clusters, the clusters being defined in accordance with ranges of at least one of the predictors, with each cluster having a weight $W_j$ which is to be determined (using an algorithm).

In operation S10 an algorithm builds a model predicting the weights $W_j$ by solving a system of equations, one per trip. Each equation equates the known total energy consumption T of the trip with the sum of the known length measure of each segment in the trip multiplied by the weight for the cluster into which the segment was grouped.

In operation S12, for each segment, a the predicted weight $W_j$ applied to the cluster in which the segment was grouped is assigned as the predicted rate of energy use $Y_i$; and the method stores a segment ID with an indication of the predicted rate of energy use $Y_i$ to allow prediction of energy use for a route in the geographical area incorporating one or more of the segments.

Hence querying the model allows the energy use of a route to be determined. The querying may be remote.

Key features of the method described above may include:
Prediction of energy consumption for each road segment from aggregated driving statistics without link level ground truth value for energy consumption. Moreover, there is no need for intermediate (link level) driving data like velocity, acceleration etc.

Clustering of predictor space (which is the multidimensional space in which all the possible values of the predictors of the rate of energy use may be plotted) into clusters/bins The use of an algorithmic techniques such as constrained optimization or projected gradient descent to obtain natural weights in model. This results into interpretability of weights after training: they represent the energy consumption rate of each road segment.

Method to recover the contribution of each constituent in an aggregated statistic.

Does not rely on historical time series data of the same vehicle for estimation purposes. Thus, the embodiments may completely avoid the use of time-series data which maps a journey into segments.

Exposition of Underlying Idea Calculations

Embodiments present a method to estimate the contribution of individual components to an aggregated statistic. An aggregated statistic T is defined as the sum of random variables $Y_i$, from other random variables, that is:

$$T = \sum_{i=1}^{M} \lambda_i * Y_i,$$

where $\lambda_i$ are given and may vary across data points. Data consists of total ground truth values $T^{(k)}$, $\lambda_i^{(k)}$ for T and $\lambda_i$, i=1, ..., M respectively, where k=1, ..., K is the size of dataset. K may be considered as paths in a graph with a total number M of edges (segments), and M>>K, meaning that M is many orders of magnitudes larger than K. For example, in the energy calculation example, T is the total energy consumption, which is known for any trip in the dataset, $Y_i$ is the energy consumption rate of road segment i over the distance in the road segment, M is the total number of road segments (edges) across the whole map (the graph), K is the number of trips in the dataset (each trip a path in the graph), and $\lambda_i$ is a (known) length measure for a segment.

Correspondingly, for predicting contribution over time to an aggregated statistic, T is the total contribution, which is known for any trial in the dataset, $Y_i$ is the contribution rate of segment i over time, where M is the total possible number of segments, K is the number of trials in the dataset, and $\lambda_i$ is a (known) length measure of time for a segment.

The goal is to infer $Y_i$s given total ground truth values for $T^{(k)}$ and $\Lambda^{(k)}$ in the following system of equations:

Equation 1, Underdetermined system of equations to solve for $Y_i$s $$\begin{cases} T^{(1)} = \sum_{i=1}^{M} \lambda_i^{(1)} * Y_i \\ \quad \quad \ldots \\ T^{(K)} = \sum_{i=1}^{M} \lambda_i^{(K)} * Y_i \end{cases}$$

The difficulty in solving the latter system in Equation 1 is that it is highly underdetermined, and any data driven method is likely to overfit. This section will introduce a method to model the $Y_i$s using clustering of predictor space, to make the system of equations in Equation 1 tractable. Moreover, constrained optimization (optimizing the energy function with respect to some variables in the presence of constraints on those variables) may be used in domains where there is a need to acquire a model with weights representing physical quantities.

The method may be used to estimate the energy consumption for each road segment, without a link level ground truth value for energy consumption or motor/driving data. The goal in this problem is to recover the 'contribution' of each road segment $Y_i$ to the total energy consumption T for each trip. The difficulty doing so is the nature of the data: generally, there is much less data available than the number of unknowns $Y_i$, resulting in an underdetermined system of equations as in Equation 1.

The main idea is to group (road) segments $Y_i$, $i=1, \ldots, M$ using, for example, a clustering technique into groups of similar segments, referred to as bins $W_j$, $j=1, \ldots, N$ with $M \gg N$ in order to reduce the number of unknowns and make the system of equations in Equation 1 tractable. Then, it is possible to use a technique such as constrained optimization to infer the bin values in order to have natural weights in the model: the model weights represent the energy consumption rate of each road segment.

Figure 3:
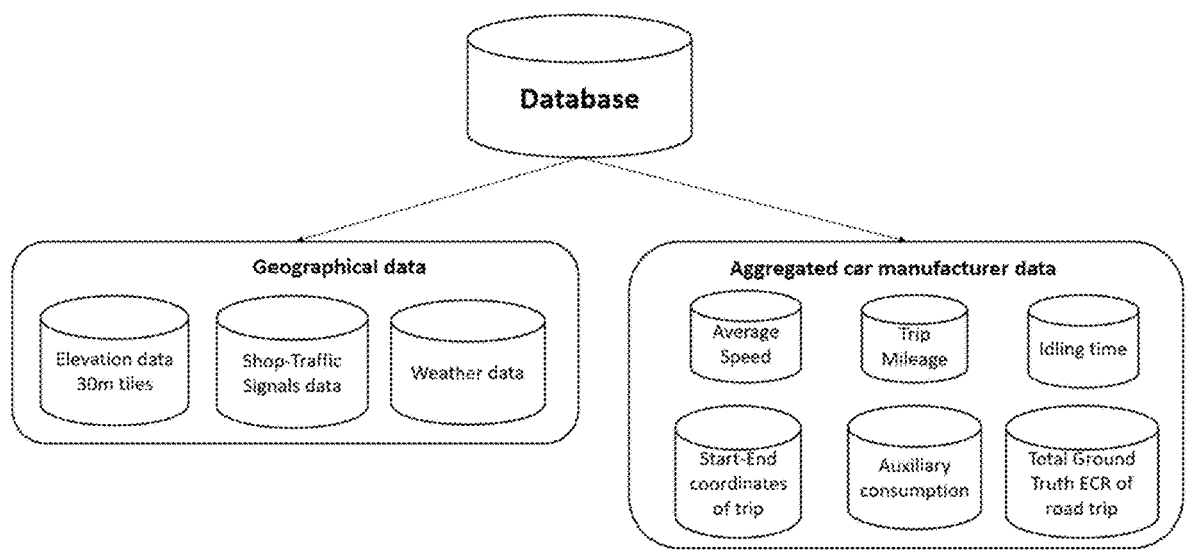
FIG. 3 is a diagram of a database for use in modelling energy use according to an embodiment.

As mentioned above, the energy consumption rate $Y_i$ is affected by various factors. At least some of these may be publicly available for each road segment. For example, geographical data available include 30-meter mesh elevation data as well as location of shops and traffic signals in the map may be input into the model from public sources. Regarding the weather, information about the ambient temperature, wind and precipitation on per hour basis may be used. Finally (a) car manufacturer(s) and/or other source may provide road trip data containing the start and finish point of trips, distance of the trips, average speed, auxiliary consumption, idling time and a total ground truth values for the total energy consumption (no ground truth values for energy consumption at intermediate locations, referred as link level ground truth, are known though). A data diagram is presented in FIG. 3, showing a database for use in the modelling which may contain any of the geographical, weather and aggregated car manufacturer data listed above.

Predictors may be inferred from existing data sources. For example, road junctions may be used as predictors, which may be implemented by, for example, adding a Boolean variable to each node in a road graph (a segment is the road part between 2 nodes) that describes if the node is a junction or not. For example, if at least one of the road segment nodes is a junction then put the value 1 at the road segment (indicating presence of junction), else put 0. Alternatively, for each segment the method may find the total number of neighbouring segments, which is simple to implement using OSRM or GraphHopper, for example. The predictor may then be defined by counting how many neighbours a road segment has (segments having neighbours >2 indicates a junction exists). The more crowded is a segment the higher we would expect the ECR to be (due to idling or breaking down).

One aim is to infer the energy consumption for each road segment in a map, such as Japan map for example, potentially even for road segments that are not present in any of the trips in the dataset. This may be achieved by clustering segments that are not in any of the trips according to the predictors and giving them the weight from the cluster into which they have been assigned. Then, the inferred values may be used in conjunction with a shortest route-finding algorithm (like Dijkstra's or A*) to find the most energy efficient route between two points in the map.

This method introduces a robust way of modelling each road segment and infer the energy consumption of each of them. Clustering of the predictors in multi-dimensional predictor space may be used to make the problem tractable and constrained optimization may be used in order for the energy consumption weights of the model to have natural values. This method may be used to address any problem that requires modelling and estimation of individual components that contribute to an aggregated statistic. In many situations in real life there is the need to make time series predictions using aggregated information: the goal is to infer the values for a response variable at intermediate time steps (per hour, day etc) using aggregated information at bigger time frames (e.g. daily, monthly or yearly). This happens frequently in fields such as finance, production management and anomaly detection.

Detailed Calculations

As described earlier, the aim of this method is to predict the effect of each individual component $Y_i$ on an aggregated statistic $T = \sum_{i=1}^{M} \lambda_i * Y_i$, where $\sum_{i=1}^{M} \lambda_i = 1$, and M denotes the number of all possible components (road segments in our energy consumption example). The $\lambda_i$s (e.g. road segment length measures) are known by the problem at hand but in general they are not constant across different samples. Therefore, for the k-th sample (e.g. a representative single trip in the dataset) we have, $$T^{(k)} = \sum_{i=1}^{M} \lambda_i^{(k)} * Y_i \qquad \text{Equation 2 (System of equations to solve)}$$

where $k=1, \ldots, K$ is the total number of samples in dataset and $T^{(k)}$ denotes the total ground truth value of the statistic T on the k-th sample.

Observe that the condition $\sum_{i=1}^{M} = 1$ is not at all restrictive because if the sum of $\lambda_i$s is not equal to 1, Equation 2 may divided by $S = \lambda_{i=1}^{M} \lambda_i^{(k)}$ and converted to equivalent form $T'^{(k)} = \sum_{i=1}^{M} \lambda_i'^{(k)} * Y_i$ where $$T'^{(k)} = \frac{T^{(k)}}{s}, \lambda_i'^{(k)} = \frac{\lambda_i^{(k)}}{s},$$

and now $\sum_{i=1}^{M} \lambda_i'^{(k)} = 1$.

The goal is to recover the effect that each $Y_i$ has on T (i.e., find the value for each $Y_i$) knowing only total ground truth values for T. Hence the goal is to solve the system $$\begin{cases} T^{(1)} = \sum_{i=1}^{M} \lambda_i^{(1)} * Y_i \\ \ldots \\ T^{(K)} = \sum_{i=1}^{M} \lambda_i^{(K)} * Y_i \end{cases}$$

for the $Y_i$s given the true values for $T^{(k)}$ and $\Lambda^{(k)}$ for every $k=1, 2, \ldots, K$. The difficulty in solving that system (without overfitting to the data) is that it is generally highly underdetermined with M>>K, i.e., the number of samples (e.g. trips in the dataset) is much less than the number of unknowns (e.g. rate of energy consumption for a segment) $Y_i$, i=1, . . . , M.

Take the example that $T^{(k)}$ represents the total ground truth value for the energy consumption rate at the k-th trip in the data and $Y_i$ represents the energy consumption rate of a road segment in map. The energy consumption rate (ECR) is defined as the energy consumption (difference between start and end battery capacity) divided by the total length of the trip. There might be billions (or even more) road segments (M) in the map to infer, however only information for, for example, a few thousand within trips K is present. When modelling each road trip, $\lambda_i^{(k)}$ will be zero if the i-th road segment of the map is not present in the trip. Therefore, the system of equations is also very sparse. Hence, K is of order of thousands and M (the total number of different road segments in the map) is of the order of billions (or higher), and the system is highly undetermined. To denote that M is many orders of magnitude larger than K we write M>>K.

To reduce the number of unknowns M and make inference tractable, a grouping of segments $Y_i$ is provided using a clustering-binning technique into W clusters, each with N segments. Denote by weights $W_1, \ldots, W_N$ with M>>N the N clusters that $Y_i$ falls into and by $d_i^{(k)}$ the accumulated fractions that each cluster type appears in k-th equation, i.e.,

---

Initialize $d_i^{(k)} = 0$ for k = 1,2, ... , K and i = 1,2, ... , N.
For k = 1,2, ... , K: (for each trip in the dataset)
    For i = 1,2, ... , N: (for each of the segment in one cluster)
        If ($i^{th}$-type of cluster is present in the k-th equation/trip, then:
            $d_i^{(k)} += \lambda_i^{(k)}$
        Else:
            Continue looping, don't add something
    End for
End for

---

This loop simply adds the length measures of the segments of each cluster type included in the trip together to give a length measure $d_i^{(k)}$ for the k-th cluster. Recall that this is a fractional length measure in this case.

Then, the system of equations in Equation 2 becomes $$\begin{cases} \sum_{j=1}^{N} d_i^{(1)} * W_j = TrueVal^{(1)} = T^{(1)} \\ \ldots \\ \sum_{j=1}^{N} d_i^{(K)} * W_j = TrueVal^{(K)} = T^{(K)}. \end{cases} \quad \text{Equation 3}$$

Notice that $d_j^{(k)}$ is zero if the j-th bin does not appear in the k-th sample/trip. Observe that now the sum is over all possible bins N whereas previously the sum was over all possible components M (M>>N). The difference is that now this system is tractable because the total number of unknowns weights $W_j$ (which is of course N—the same as the number of bins) may be chosen appropriately during clustering-binning (N may be chosen close to K or less than K for example) to be of the same order (or less than) the number of training points/trials K. Recall that the goal is now to find the values for $W_j$ given $d_j^{(k)}$ and $TrueVal^{(k)}=T^{(k)}$ for every k=1, . . . , K. To solve the above system of equations in Equation 3, any optimization algorithm or Neural Network architecture could be used. The recommended method here uses a quadratic optimization algorithm with constraints for the $w_j$s from "cvxpy" library (<www.cvxpy.org/>) in python and "OSQP" solver with max iterations 50K for fitting the data.

Using a Neural Network, the training is as follows: during training the model makes predictions $$\sum_{i=1}^{N} d_i^{(k)} * W_i = Prediction^{(k)}$$

for every k=1, . . . , K. The learning happens by modifying the weights $W_i$ with gradient descent such that $Prediction^{(k)}$ is close to total ground truth $TrueVal^{(k)}$ for every sample k in the dataset in terms of an appropriate metric. Using the L2 distance as a metric, i.e., the goal is to find weights $W_i$ in order to minimize $$\min_{W_i} \sum_{k=1}^{K} (Prediction^{(k)} - TrueVal^{(k)})^2.$$

Figure 4:
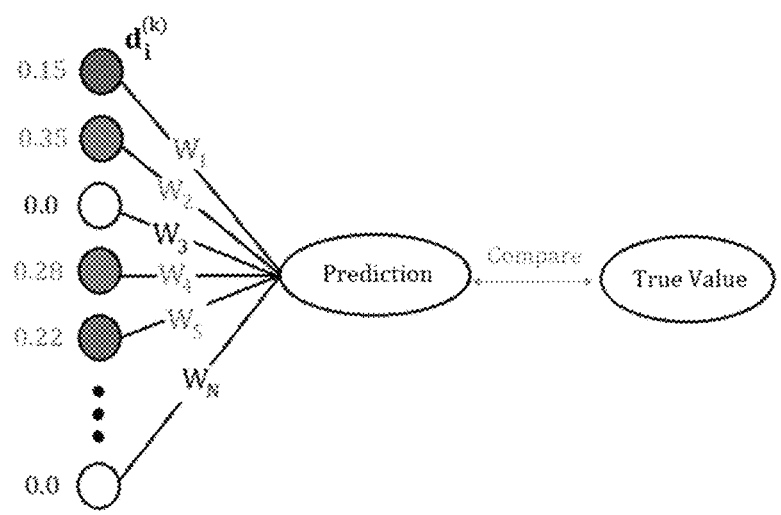
FIG. 4 is a diagram illustrating a weight adjustment used to approach the true value from a prediction built by a model according to an embodiment.

FIG. 4 is a diagram illustrating the weight adjustment used to approach the true value from the prediction built by the model. Constrained optimization in Neural Networks may be achieved with projected gradient descend techniques. It is similar to the standard backpropagation technique, with the only difference being projecting the gradient descent update to the feasible region of the constrained space.

After finding the weights $W_i$ (weights for each bin-cluster) every road segment in the map (including those not forming part of any trip) may be classified to a particular cluster, hence it is related to a weight value. This information may be saved in a dictionary {road_ID: bin-cluster} and be used in a route engine which implements route optimization algorithms (like Dijkstras or A*) to find the most energy efficient route.

Figure 5:
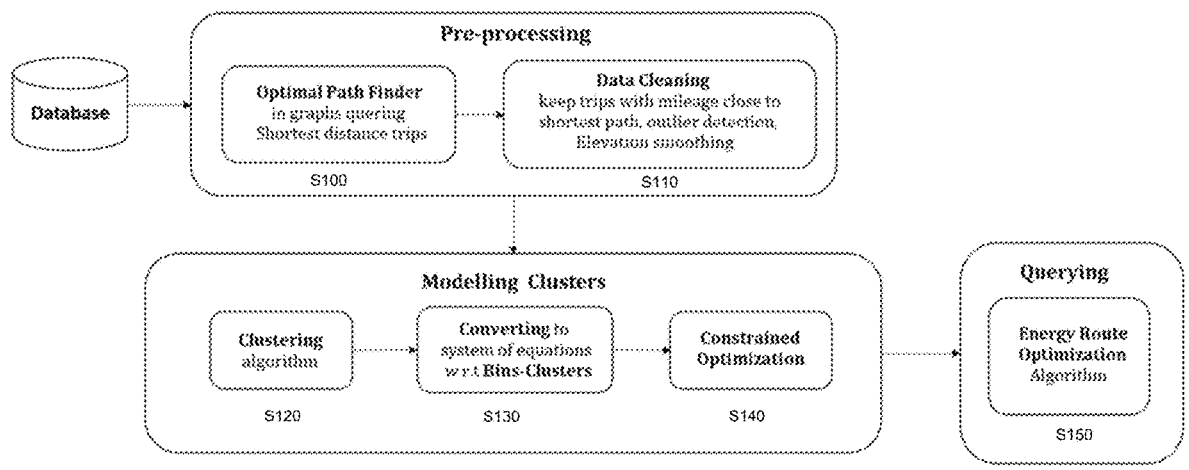
FIG. 5 is a process flow diagram depicting the underlying ideas according to an embodiment.

A process flow diagram depicting the underlying ideas in one embodiment is presented in FIG. 5. The database provides data for optional pre-processing (depending on the input dataset), which uses an optimal path finder to find shortest distance trips (S100) and optionally to carry out data cleaning including, for example elevation smoothing and outlier detection and to keep only trips with distance close to the shortest path (S110).

The pre-processed selected trips are fed to a stage of modelling clusters, in which a cluster algorithm allocates the trips to bins/clusters (S120). This allows the equations to be converted into equations related to the bins (S130). Constrained optimization solves the converted equations in S140 and then the system may be queried for the best route between different locations in S150.

Application of Method to Energy Efficient Route Optimization

This example determines the contribution of each road segment to the total energy consumption of a trip, without link level ground truth values for the energy consumption (EC) (see FIG. 1c) and without driving/motor information at intermediate points, using only aggregated information.

Finding the energy consumption is equivalent to finding the energy consumption rate (ECR=EC/distance), given the distance, hence the goal will be to infer the ECR of each road segment, given total ground truth value of ECR for the trip. The ECR may be stated in a standardised/averaged way, which may then be compensated to take into account EV/driver specific characteristics.

Total ground truth values for the energy consumption rate for road trips as well as average speed and estimates for auxiliary consumption are provided, for example by a major car manufacturer.

The exact path that the EV followed is unknown since no GPS was used at intermediate locations of each trip in the trip database. To deal with this uncertainty the method kept only a small fraction of the trips: those whose reported mileage by the car manufacturer was no more than 2% different from the shortest path joining the start and end point from each trip. The shortest path joining the start and end point for each trip was found using shortest distance path finder software in graphs and then was compared with the actual mileage. If it was at most 2% different from the actual mileage, then it is assumed that the driver followed that shortest route otherwise the trip was discarded. Notice that there is still 2% uncertainty in the exact path followed by the EV and this adds up to the total error of this modelling approach. Of course, if a GPS for measuring the exact path is present then there will be a 2% boost in performance and no trips need to be removed. Afterwards more cleaning steps are performed like elevation smoothing, removal of corrupted data and outlier detection.

Figure 6:
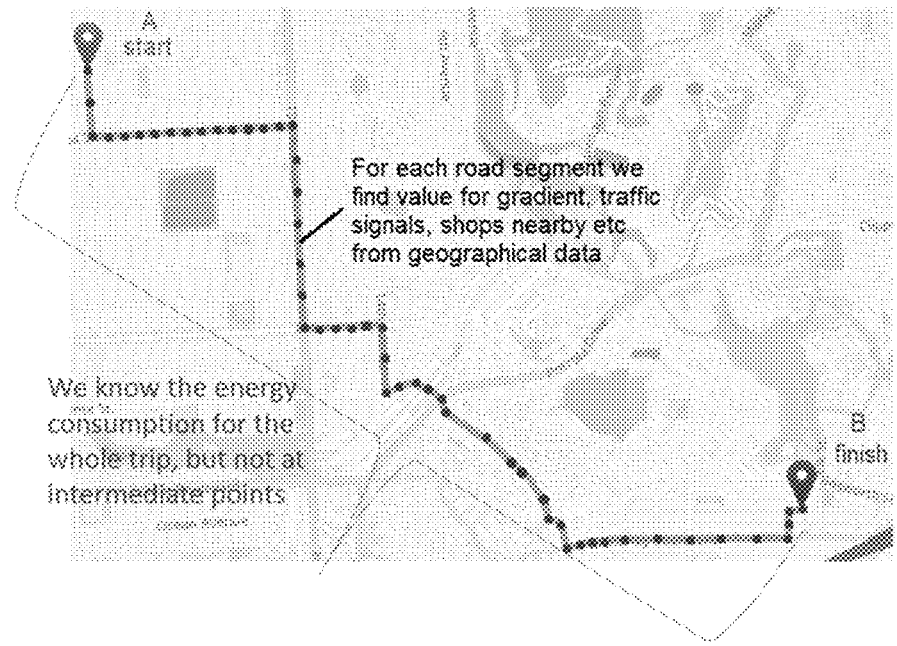
FIG. 6 is an example of a map illustrating a trip from A to B according to an embodiment.

FIG. 6 shows a map with a trip illustrated from A to B. The method first filters trips and keep those with mileage close to the shortest route for the trip from A to B. In addition, the method decomposes the filtered trips into their constituent route segments using geographical data available before clustering them. For each trip, the method may use the information depicted in the figure: energy consumption for the whole trip (but not for the intermediate points) and, for each road segment, the gradient, traffic signals, shops nearby and any other useful geographical data. The energy consumption rate of each road segment may be regarded as a function of such predictors.

Each road segment is the portion of the trip between 2 points as depicted in the figure. To calculate the gradient, geographical data (e.g. 30 m mesh of tiled elevation data) may be obtained from any publicly available sources (like JAXA <www.eorc.jaxa.jp/ALOS/en/aw3d30/index.htm>) using additional elevation smoothing.

Here, the route segments are small parts of the road graph that belong to the current trip. It is possible (by using open source routing engines like GraphHopper) to retrieve the intermediate geographical points in the road graph for the shortest trip between 2 points A and B. The same procedure could alternatively use a GPS logger.

The energy consumption rate (ECR) of each road segment will be $Y_i$ and the aggregated statistic T is the total ground truth ECR of the whole trip. Therefore, $T = \sum_{i=1}^{M} \lambda_i * Y_i$, where $\sum_{i=1}^{M} \lambda_i = 1$, and M denotes the number of all possible edge segments in the map. The $\lambda_i$s denote the distance of each road segment divided by the total distance of the trip (so that their total is 1). The goal is to infer the values for $Y_i$s given total ground truth values T for the ECR of trip and $\lambda_i$ are known from the geographical data (FIG. 3). There is a system of such equations so solve for $Y_i$, one equation per road trip in the dataset:

$$\begin{cases} T^{(1)} = \sum_{i=1}^{M} \lambda_i^{(1)} * Y_i \\ \ldots \\ T^{(K)} = \sum_{i=1}^{M} \lambda_i^{(K)} * Y_i \end{cases} \quad \text{Equation 4}$$

where K denotes the total number of trips in the dataset. Observe that most of the road segments will appear only in a few trips, therefore the system in Equation 4 is highly underdetermined (M>>K) and sparse since most $\lambda_i^{(k)}$s will be zero.

In order to make the system of equations tractable, the method reduces the number of unknowns by grouping $Y_i$ into bins or clusters. Any clustering technique for road segments that minimizes loss of information may be used for making the latter system in Equation 4 tractable.

After clustering, each $Y_i$, i=1, ..., M will fall into a particular bin-cluster $W_j$, j=1, ..., N with M>>N. These clusters may represent grouping of edges with characteristics that result in similar energy consumption rates. For example, one cluster may contain road segments with gradient in range [0,0.05), number of traffic signals in range [2,5), number of shops in range [5,10) etc.

These clusters effectively define types of road segment and may be imagined as volumes in multi-dimensional predictor space. They could either be specified beforehand by a clustering algorithm, for example using the method in the co-pending, co-owned application mentioned above or by domain experts, depending on the use case. Any quantization-clustering approach results into loss of information hence it is critical to select groupings that result in minimum information loss.

Figure 7:
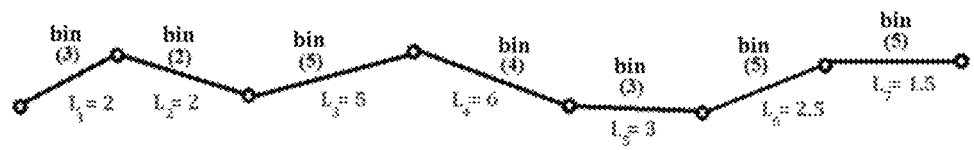
FIG. 7 is a diagram illustrating a trip divided into segments and the segment bins (clusters) according to an embodiment.

Then, for each trip in the dataset, the accumulated distance for each segment cluster is kept in a dictionary and a table created with the corresponding distances divided by the total length of the trip as columns. For example, FIG. 7 shows a diagram of a trip of length 22, divided into segments (edges) and their allocation to clusters as "bin (bin number)". The diagram also shows the length of each segment as $L_i$. In this case, the following dictionary keeps track of the accumulated segment length measures in each of clusters 1 to N for the trip concerned:

{1: 0, 2: 2/22, 3: 5/22, 4: 6/22, 5: 9/22, 6: 0, 7: 0, ..., N: 0}

For example, here there are no segments in clusters 1, 6 and 7. The total length in cluster 2 is 2 (out of the total length of 22). The total length in cluster 3 is 5, which is made up of 2 separate segments (out of the total length of 22).

From the dictionary the following equation is obtained to take into account the lengths of the segments (and thus length measures) in each cluster and the weights for each cluster:

$0*W_1 + 2/22*W_2 + 5/22*W_3 + 6/22*W_4 + 9/22*W_5 + 0*W_6 + \ldots + 0*W_N = \text{TrueVal}$ or, generally:

$$\sum_i W_i * \frac{L_i^k}{L} = ECR[trip_k].$$

Moreover, this trip may be added to a table with cluster columns 1 up to N using the dictionary, by creating a row in the table and adding values for each cluster as the corresponding dictionary values.

The method proceeds as above for every road trip $k=1, \ldots, K$ available in the dataset. Then, the table will have K rows and (N+1) columns where one column is the final total per trip stands for the total ground truth ECR and the other N columns are for the different types of bins.

In one arrangement, these values may be the inputs to a machine learning model to try to predict the energy consumption rate (hence energy consumption) for each type or cluster of road segment. For example, when training a one-layer neural network, the model makes predictions $$\sum_i W_i * \frac{L_i^k}{L} = \text{ECR\_Pred}[trip_k],$$

and the goal is to find weights $W_i$ to minimize the error:

$$\min_{W_i} \sum_{k=1}^{K} (ECR[trip_k] - \text{ECR\_Pred}[trip_k])^2.$$

After finding the weights $W_i$ (ECR for each road segment-bin), a lookup table may be created and this, for example, may be passed into a route engine that may calculate energy consumption rate for a given route and, for example, implement a route optimization algorithm for energy efficient route optimization.

The method may alternatively use a quadratic optimization algorithm with constraints for the $W_i$s from "cvxpy" library in python and "OSQP" solver with max iterations 50K for fitting the data. The constraints may be chosen so that the resulting weights (after fit) reflect the energy consumption of each road segment and are as natural as possible. Moreover, an ordering of bins $W[i] \leq W[i+1]$ may be introduced according to the impact that each predictor has to the problem (for example, if a bin has gradient 0.2 and another bin has gradient 0.1 and all other predictors are the same, then the latter bin will be associated with lower ECR, and therefore lower $W[i]$). This ordering may take into account both the importance of predictors and the natural ordering within each predictor.

The goal of the ordering is for the weights of the model to represent the energy consumption of a road segment. This increases the interpretably of the model and makes results more natural. The impact (and thus the ordering) of each predictor may be determined in an automated fashion by using random forest algorithm (hence evident from the data). For example roughly 2000 trees may be trained on data (X,Y) where X are the aggregated predictors across the whole trip (e.g. average gradient of the trip, total number of shops divided by distance, total number of traffic signals divided by distance etc.) and $Y_i$ are the ground truth values of the energy consumption of each trip. By plotting a feature importance diagram after the training, the importance of each feature may be measured. More important features should be partitioned into more clusters when clustering values and their split values may be determined as described in the co-pending, co-owned application mentioned above.

As an example: the gradient could be partitioned into 8 bin divisions, each with a given gradient range:

$B_1=[-\infty,-0.25)$, $B_2=[-0.25,-0.12)$, $B_3=[-0.12,-0.05)$, $B_4=[-0.05, 0)$, $B_5=[0,+0.05)$, $B_6=[0.05,0.12)$, $B_7=[0.12,0.25)$, $B_8=[0.25,\infty)$, and ordering means that the weight for bin division 1 is the smallest and that $W_1 \leq W_2 \leq W_3 \leq \ldots \leq W_8$, where $W_i$ is the 'weight' i.e. the predicted energy consumption rate for the bin $B_i$, $i=1, 2, \ldots, 8$. The effect of ordering is to make the results of model interpretable and natural: lower gradient should have lower energy consumption ($W_i$).

Number of Shops could be partitioned into 4 bin divisions: $[0,5),[5,10),[10,20),[20,+\infty)$. Again, the ordering of weights says that the model should conform to the rule: a lower number of shops should be associated with less energy consumption.

The total number of bin divisions (8 for gradient and 4 for shops) may be selected according to the feature importance after training the random forest. Gradient had more importance therefore was partitioned into more bin divisions. The total number of bins is a hyperparameter that needs to be tuned by the user taking into account the number of data available and usually requires cross-validation.

Figure 8:
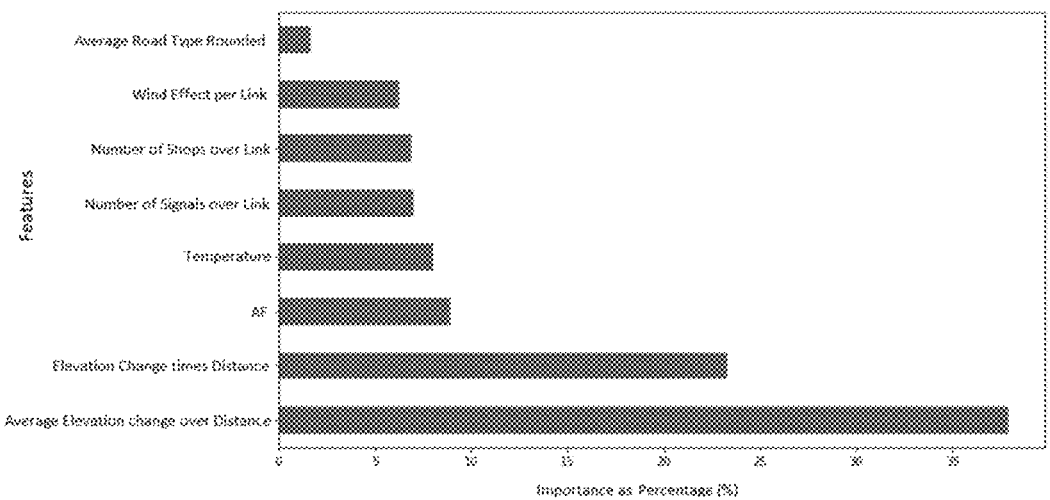
FIG. 8 is a bar chart depicting the importance of a range of predictors according to an embodiment.

An example feature importance diagram created from real data may be seen in FIG. 8. In order of increasing importance, the predictors are: average road type rounded; wind effect per link (segment); number of shops over the link; number of signals over the link; temperature; AF (Aerodynamic Factor), which may be defined as $\Sigma_{i=1}^{n}(v_i+w_i)^2 \times S_i$ where $v_i$ is the speed of vehicle in the i-th road segment and $w_i$, $S_i$ the wind speed and distance in each segment, respectively. In the absence of road link information, the AF may be estimated as $(\overline{v}+\overline{w}) \times S$ where $\overline{v}$, $\overline{w}$ are the average speed and wind speed and S the total length of trip; elevation change times distance and average elevation change over distance.

Figures 9, 10, 11:
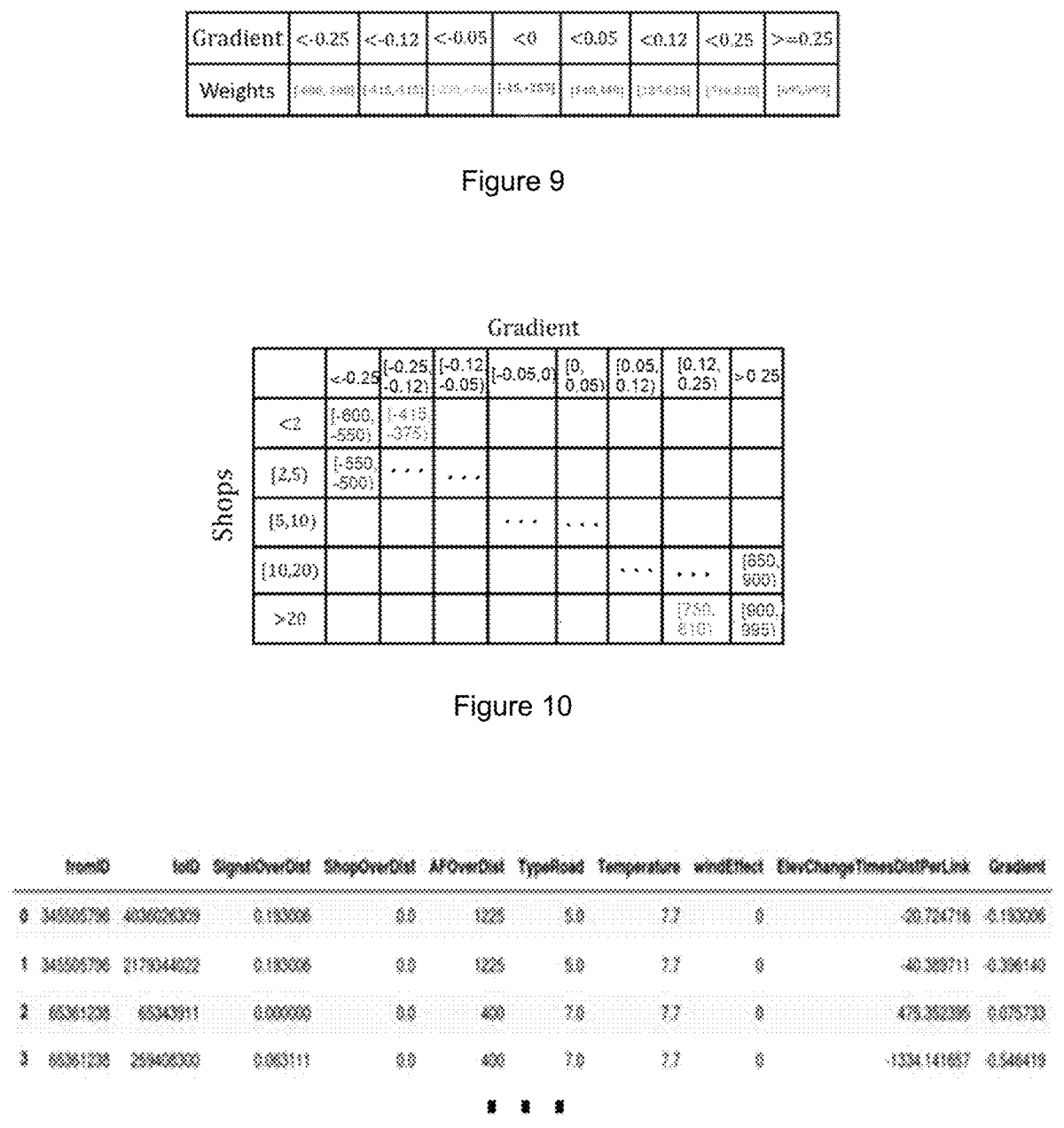

The constraints are imposed in matrix form for each bin. For example, using only as predictor the gradient then the constraints are summarized in a 1-dimensional array as shown in FIG. 9.

The weights reflect the energy consumption rate of road segments with gradients in the corresponding row position. The constraints take the form of an interval by specifying the lower and upper bound for each bin: e.g. the energy consumption should be between −600 and −300 for gradient less than −0.25. Using 2 predictors, e.g. gradient and number of shops, then the constraints take a form of 2D matrix as shown in FIG. 10. In a more general sense, this is a hypercube with appropriate ordering. FIG. 10 illustrates this ordering well. Each bin (in the 2D matrix in FIG. 10) is associated with a range of ECR values that have a mean value (middle point). The ordering is implicitly present here. The bins can be ordered in ascending or descending order according to the mean ECR.

Generally using N predictors, the constraints will be a N dimensional array (hypercube) whose values may be set via a 'for' loop. Notice that the values for upper and lower bound of weights are problem specific and may be tuned by the user (as hyperparameters) or by a domain expert. A grid search may also be applied that tunes the ranges greedily one at a time. For example, the user may specify a lower and upper bound for the search space as well as a step. Then, a grid search will try all possible combinations. In one-dimension, this may involve specifying a lower bound (say, −400), an upper bound (say, 400), and a step size (say, 100); the grid search will then look at all combinations [−400,−400], [−300,−200], . . . , [300,400]). There will be 4×3=12 total combinations (since X1 can take 4 different intervals

[−200,−100],[−100,0],[0,100],[100,200] and X2 can take 3 intervals [10,20], [20,30], [30,40]). The combinations are:
X1 in [−200,−100], X2 in [10,20]
X1 in [−200,−100], X2 in [20,30]
X1 in [−200,−100], X2 in [30,40]
X1 in [−100,0], X2 in [10,20]
X1 in [−100,0], X2 in [20,30]
X1 in [−100,0], X2 in [30,40]
X1 in [0,100], X2 in [10,20]
X1 in [0,100], X2 in [20,30]
X1 in [0,100], X2 in [30,40]
X1 in [100,200], X2 in [10,20]
X1 in [100,200], X2 in [20,30]
X1 in [100,200], X2 in [30,40]

The skilled reader will understand that higher-dimension grid searches work in analogous ways.

The clusters are created by dividing the N dimensional space into clusters: each cluster encompasses a range of each of the predictors. In one example, in which one predictor is used, the number N may be equal to the number of. In an example using two predictors, the first may give N1 intervals and the second may give N2 intervals, resulting in N1×N2 total clusters, for example as set out above.

Imposing constraints on the weights of the model results into a more natural fit. Observe that in the previous modelling technique the weights of the Neural Network have a physical interpretation: they represent the energy consumption rate of each road link bin-cluster. This way it is easier to understand the predictions made by Neural Network and interpret the weights after learning. Understanding the predictions of a Neural Network is much more critical in other domains such as in medicine or autonomous driving.

A routing engine may then be used to generate a route. The routing engine may use two different models. The first model may use only, for example, gradient, traffic data, shops etc. to make a model for the routing engine in order to find the most energy efficient route. The second model may be used for accurate ECR estimation of the most energy efficient route.

After finding the most energy efficient route using the first model, two questions arise: how much energy will the route cost, depending on the driving style, weather, speed etc; and does the vehicle, at present, have enough energy (battery capacity remaining) to perform this path? In order to perform accurate estimation, the method may use more predictors (speed, temperature, wind etc.) to build a second model from, for example, manufacturer's data. The method may quantize or cluster the predictors and solve a system of equations (as described above) to infer a value for each cluster. If the vehicle does not have enough energy, the vehicle must be re-routed to the closest charging station. That is, the method may find the most energy efficient path to the closest charging point and re-route once more after charging.

Elevation Smoothing Some arrangements use elevation smoothing, which may function as follows: suppose that the elevations, which are obtained from 30 m mesh tiles of the elevation of a road including in a trip, have the following form: [5, 5, 5, 10, 20, 20, 20, 20, 0] where the numbers represent altitude in meters from sea level. The constant numbers 5,5,5 at the beginning occur due to road trips points belonging to the same elevation tile (the tile consists of points at the same elevation). The algorithm "smooths" the elevations as follows: the goal is to change the second and third elevation in the list of elevations in order to obtain a smoother transition from the first point A with 5 m elevation to the fourth point B with elevation 10 m (similarly smoothing from 5th point of elevation 20 m up to 9th point of elevation 0 m). Consider the points [A,X,Y,B] with elevations [5, 5, 5, 10] respectively that comprise the first 4 points in the aforementioned list. Denote by E(X) the elevation of point X then at the moment [E(A)=5, E(X)=5, E(Y)=5, E(B)=10]. Changing E(X) and E(Y) "smooths" the transition from A to B. Therefore let E(X)=x and E(Y)=y where x, y are to be found. Linear interpolation gives:

$$\frac{x - E(A)}{(AX)} = \frac{E(B) - E(A)}{(AB)},$$

where (AX) denotes the distance between points A and X and (AB) the distance between A and B. Since these distances are known from the map, x may be computed. For example, if (AX)=15 m and (AB)=50 m then $$x = 15 \times \frac{10 - 5}{50} + 5 = 6.5$$

m altitude. Similarly, for point Y:

$$\frac{y - E(A)}{(AY)} = \frac{E(B) - E(A)}{(AB)},$$

and y may be computed since (AY) and (AB) distances are known. If (AY)=35 m then y=8.5 m. Note that the transition between elevations [5,10,20] does not need smoothing since the points belong to different elevation tiles. Finally, the same computation is performed for the first 20 m tile and the last 0 m tile, i.e. elevation smoothing for the points with elevations [20,20,20,20,0] to obtain for example smoothing [20,13,7,3,0].

Algorithmic Parameters for an Energy Use Arrangement

The energy consumption is measured in Wh (watt-hours) and is reported in the dataset. Since also the total distance of each of the trips is known, it is possible to calculate the energy consumption rate as the energy consumption divided by distance and measured in Wh/km.

Arrangements may use the OSQP solver from 'cvxpy' library in python for sparse quadratic constrained optimization. The default parameters or lasso and ridge regularization may be used. The default parameters (for example, specifying an upper limit of iterations of 50K, specifying loss of L2, and using a matrix of inequalities (upper and lower bounds) for constrained optimization) work well because the weights after fit have a natural meaning: they represent the energy consumption rate of a road segment. Since OSQP is used for constrained optimization, a matrix with min and max value for each predictor (this is problem specific and depends on the dataset) may be used in order to obtain a table such as the table in FIG. 10 for the 2-dimensional case. Therefore, for each 'bin division' the upper and lower bound for the energy consumption must be specified. Clusters are formed from the bin divisions. For example, each cell of the table in FIG. 10 may represent a cluster. Alternatively, multiple cells (for example, the first three groups shown in the top left of this table) may be amalgamated to form a cluster, however this may introduce loss in accuracy, which is not always desirable.

The OSQP solver default parameters need a total number of iterations (for example upper limit 50K) the loss (for example L2 and user can choose L2+Ridge or L2+Lasso regularization) and a matrix of inequalities (upper and lower bounds) for constrained optimization. See <osqp.org/docs/examples/least-squares.html>.

In a Neural Network, it may be difficult to apply constrained optimization with projected gradient descent. Nevertheless, a suitable system could use a feed-forward Neural Network architecture (without constraints) using 2 up to 4 hidden layers with 200 hidden units. Of course, the skilled reader will understand that this design and these parameters will vary across different datasets. For example, with more data, one may find a deeper architecture with more layers and more hidden units to be more accurate. The dataset input (also for other algorithms) could include roughly 61000 trips after cleaning and the hyperparameters may use an Adam optimizer with a learning rate of 0.001, again in accordance with the dataset (of course, learning rates of 0.0001, 0.00001, etc. may be used; convergence is the target). The total iterations could be 20 epochs. The training may be performed using PyTorch deep learning framework.

Hardware used could be the GPU: 1080Ti GeForce 11 GB

As an example: each trip is decomposed into road segments after querying GraphHopper engine and the values for each predictor stored in a table. Each column in the FIG. 11 table corresponds to each predictor and each row corresponds to each road segment that is present in the road trip. Parameters fromID and toID correspond to points in the graph (each ID is related to (lon, lat), a longitude and latitude pair). Here, segments 0 to 3, with their start and end location IDs, are displayed along with: traffic signals in the segment, shops in the segment, AF in the segment (averaged from the whole trip data), the type of road, such as unknown, residential, unclassified, tertiary, secondary, primary, trunk or motorway (determined from map data); the meteorological temperature, and the wind effect (acquired from meteorological data); and the distance and the elevation change times the distance, which gives the gradient in the final column. The segments are of different length because the nodes in graphHopper mostly represent junctions, or important regions (such as landmarks). If this is of interest, the user can query a road trip with GraphHopper and see the different nodes and where they are located.

Figures 12, 13:
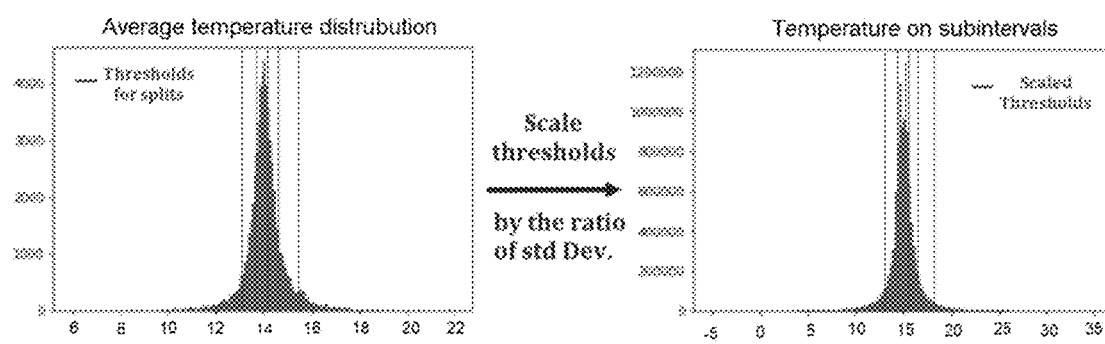
FIG. 12 shows the segments in FIG. 10 allocated to clusters (bins) according to an embodiment.
FIG. 13 shows the scaling of average temperature gradient distributions in a photovoltaic application during clustering according to an embodiment.

Afterwards, a quantization module is used to classify each row (i.e. each road segment) to the corresponding cluster as shown in FIG. 12. Finally, the OSQP solver fits the data with inequality constraints as depicted in the table in FIG. 10. The sum of the contribution of the clusters in the trip should equal the energy consumption of the trip i.e.

$$\sum_{i=1}^{N} EC(bin_i) = EC(trip),$$

where EC is Energy Consumption and the EC(trip) is known from the available data. Therefore, the goal is to infer the values for $EC(bin_i)$ for every bin by optimizing a system of equations:

$$\begin{cases} \sum_{i=1}^{N_1} EC(bin_i) = EC(trip^{(1)}) \\ \quad \dots \\ \sum_{i=1}^{N_k} EC(bin_i) = EC(trip^{(k)}) \end{cases}$$

for all k-trips present in the dataset.

Application of Method to Time Series Data for Energy Generation Estimation

Embodiments may be used to estimate the energy generated from photo-voltaic cells (PVs) at finer time periods from aggregated time series data in a data driven fashion. Many energy theoretical models exist in literature that try to estimate accurately the energy generation of PVs based on energy equations.

Suppose that it is desirable to find/predict the energy generated from PVs per minute (or per hour) given daily ground truth values for the energy generated. For example, it may be known that at the end of the day, the panel produced X Wh (watt hours) but it remains unknown how much energy the panel will produce per minute on a specific day in the future. The estimation X/1440 (since one day has 1440 minutes) is inaccurate, since energy generation depends on many environmental variables as well as panel specific factors. For example, during a cloudy day or at night, we expect the energy generation to be close to zero but during a sunny period the generation will be very high. Moreover, environmental variables change dynamically within a day since a day that might start sunny may end up cloudy and therefore different time periods will have different energy generation (different power generation in watts, therefore different energy generation in watt-hours).

Embodiments used for the above-described EV application differ from embodiments used for PV application in the domain (space for EVs and time from PVs): EV suitable embodiment estimate the energy consumption of road segments knowing the total energy consumption of the trip, and—to do so—partition the predictors with respect to space domain. Conversely, PV suitable embodiments, estimate the energy generation on a time interval, having ground truth values for the energy generation at the end of a day or for the energy generation accumulated over an extended period of time (an accumulation of data trials). Therefore, it is necessary to partition the predictors with respect to the time domain. Besides this lectical difference, switching from space to time domain makes use of the same mathematical formulation of embodiments as described above. As before, the total may be a rate (overtime in this instance) or an absolute value.

Denote the energy generation rate (EGR) within a time period t as $Y_t$, i.e., $Y_t=EG/t$ where EG stands for energy generated in Wh. Let T be the total ground truth energy generation rate. For example, if the total energy generated on a day is 2880 Wh then the energy generation rate is 2 Wh/min (or, equivalently, 120 W). Note that this aggregated energy generation rate is not a good estimator for a particular time interval of the day: during sunny intervals, generation may be 300 W whereas during cloudy intervals, the value may be 20 W (these values are hypothetical for the sake of the example).

Therefore, similar to the EV formulation above, $T=\sum_{i=1}^{M}\lambda_i*Y_i$, where $\sum_{i=1}^{M}\lambda_i=1$ and M denotes the number of all time intervals into which the day is split and. For example, if we split the day into 24 equal intervals (per hour) then M=24 if one day only is taken into account or in general 24 times the number of days sampled. Here, k denotes the number of samples actually taken, which is less than the total possible number of 24 samples.

The splitting in time intervals may be uneven according to the needs of application: for example, embodiments may split morning and afternoon periods into 10 time intervals, while evening may be split into 5 intervals and night into 2 intervals etc; the logic being to create more bins for time intervals with higher variation with respect to environmental conditions affecting the energy generation or any other strategy according to the user's intended application. That is, each interval or segment have a unique length (in time).

The goal is to infer the values for $Y_i$s given total ground truth values T for the EGR of the day and $\lambda_i$ are known from the environmental data. One may imagine that $\lambda_i$ describe the fraction of time that an environmental variable holds true: for example, if there is a sunny day with a temperature of 24° C. for 174 minutes, we may say $\lambda_1=174/1440$, where the first variable describes this environmental situation. Then, the total energy generated T will be the weighted average of energy generations $Y_i$ for all the different environmental conditions holding true for i-th fractions $\lambda_i$ within the day.

Therefore, similarly to EV application, the goal is to solve a system:

$$\begin{cases} \sum_{j=1}^{M} \lambda_j^{(1)} * Y_i = T^{(1)} \\ \quad \ldots \\ \sum_{i=1}^{M} \lambda_j^{(K)} * Y_i = T^{(K)} \end{cases},$$

which is, in general, highly undetermined since there is an enormous number of different environmental conditions (if you consider continuous values for temperature, wind direction and strength, precipitation etc.) The idea is to quantize the space of predictors by grouping 'similar' environmental conditions into the same bin, where 'similar' means having equivalent or similar effect on energy generation. For example, we may say that on a sunny day at 30° C., we expect the same or similar generation of energy as in another sunny day at 32° C. This is a very simplistic example to emphasise the point of quantization: the goal is to group values that have the same or similar effect on generation into the same bin. This quantization may be performed automatically using the co-pending, co-owned patent application mentioned above or in any other suitable way, as set out previously for the space domain example of EVs.

Following the formulation used in the above EV suitable embodiments, we regard the energy generation rate $Y_i$ as a function of some predictors $X_1, \ldots, X_n$, i.e., $$Y_i = F(X_1 = c_{i1}, \ldots, X_n = c_{in}),$$

where $c_{ij}$ are real constant values that each predictor $X_i$ attains on the i-th data point from the available data. Some predictors $X_i$ may remain constant across time (i.e. surface area and angle of solar panel, as well as its location), whereas some other predictors change dynamically within the day i.e. environmental factors such as sky temperature, ground temperature, angle of sun etc. If the data contain only one type of solar panel (same surface area and same electricity to energy conversion ratio, for example), which may be placed at a specific location, then there is not a need to quantize those variables (since they are constant across the data, they already lie on or may be sorted into the same bin). Therefore, in the latter situation, we quantize only the dynamic environmental factors that change across time. If the data contain different types of solar panels (different surface area and electricity conversion ratio), which may be placed at different locations, these predictors should also be quantized.

Any clustering technique suitable for environmental data and solar panel specific data, which minimizes loss of information, may be used for making the system in Equation 4 (applied to embodiments suitable for PV energy generation estimation). For example, the following clustering method (grouping of segments from the trials) may be used.

1. From geographical data and type of solar panel, acquire constructed aggregated predictors, for example:
   a) Average sky temperature
   b) Average ground temperature
   c) Average PV glass temperature
   d) Average angle of sun
   e) Portion of time the day was sunny
   f) Portion of day that it was cloudy (etc. for other condition like rain—snow)
   g) Average area of solar panel
   h) Average electricity to energy conversion ratio
   i) Etc. depending on the data at hand
2. Train random forest with the aggregated data to predict the total energy consumption rate of trip.
3. Keep track of the feature values used for splitting the nodes for each tree inside the Random Forest in a data structure like list. For example:
   Average temperature: [32, 15, 2, 8, 21, . . . ]
   Portion day was sunny [0.2, 0.05, 0.15, 0.3, 0.5, . . . ]
   Portion of day that was cloudy [0.1, 0.4, 0.05, 0.2, . . . ]
4. Create histogram for split values for each predictor.
5. Find peaks of histogram.
6. Parallel transport by the difference of means and scale by the ratio of standard deviations of the distributions (see FIG. 13, for example):

$$c_i = (p_i - \mu_1) \times \frac{\sigma_2}{\sigma_1} + \mu_2$$

7. Quantize according to scale peaked values. Then, the system (Equation 1) will transform into (Equation 3):

$$\begin{cases} \sum_{j=1}^{N} d_j^{(1)} * W_j = T^{(1)} \\ \quad \ldots \\ \sum_{j=1}^{N} d_j^{(K)} * W_j = T^{(K)} \end{cases}$$

8. Solve system using, for example, OSQP solver from cvxpy library (if one wishes to impose constraints) or a feed forward neural network architecture (if no constraints are imposed). The architecture will depend on the type and size of dataset and number of predictors. One may use regularization techniques such as dropout, Ridge (if it makes sense for the weights to be small in the problem), or Lasso (if one wishes to impose sparsity). These regularization techniques may also be imposed for constrained optimization.

In an analogous manner to the EV embodiments described in preceding sections, the transformed system of equations (operation 7 above), when solved, gives predicted cluster weights, which may be used in PV energy generation forecasting.

General Application for Inferring Values of a Quantity at Finer Time/Space Periods Using Aggregated Data In general, embodiments may be applied to any problem that encompasses aggregated time/space data and, in which, the goal is to predict the effect of some predictors on finer time/space periods. For example, in finance-related contexts, the energy generated (EG) could be replaced by income, then the energy generation rate (EGR) may be replaced by income rate (IR).

Suppose that one has values for the income on a daily basis and wishes to estimate the income in finer time periods (income per minute or per hour, for example) using some predictors $\lambda_1, \ldots, X_n$ (the predictors may be anything that the user thinks or knows influences the income). Denote income rate within a time period t by $Y_t$, i.e., $Y_t = I/t$ where I stands for the income. Let T be the total ground truth for the income rate. Then $T = \sum_{i=1}^{M} \lambda_i * Y_i$, where $\sum_{i=1}^{M} \lambda_i = 1$ and M denotes the number of all time intervals into which split the day is split. Similarly to the examples described above, the aim is to solve a system (Equation 1):

$$\begin{cases} \sum_{j=1}^{M} \lambda_j^{(1)} * Y_i = T^{(1)} \\ \ldots \\ \sum_{i=1}^{M} \lambda_j^{(K)} * Y_i = T^{(K)} \end{cases}$$

and, because this is highly underdetermined, the income rate $Y_i$ is regarded as a function of some predictors $X_1, \ldots, X_n$, i.e., $$Y_i = F(X_1 = c_{i1}, \ldots, X_n = c_{in})$$

where $c_{ij}$ are real constant values that each predictor $X_j$ attains on the i-th data point from the available data. Afterwards, the space of predictor space is quantized (for example, using the method as in steps 1)-7) above) to solve the transformed system of equations (Equation 3):

$$\begin{cases} \sum_{j=1}^{N} d_j^{(1)} * W_j = T^{(1)} \\ \ldots \\ \sum_{j=1}^{N} d_j^{(K)} * W_j = T^{(K)} \end{cases}$$

with any constrained optimization solver or Neural Network (or any other approach that the user prefers).

SUMMARY

In one definition, there is provided a computer-implemented method for route optimisation, comprising: collecting aggregate route segment data, wherein the aggregate route segment data includes geographical data and vehicle data, wherein the vehicle data includes vehicle energy consumption rate for vehicle trips; and clustering the segments of trips into a plurality of bins, wherein the segments of trips in each bin share data characteristics that result in similar energy consumption rates; and estimating the vehicle energy consumption rate of at least one individual route segment by comparison with the clustered segments of trips.

The method may provide robust estimation with a modelling approach using clustering in order to make tractable an inaccessible system of equations and recover the effect of each road segment to the total energy consumption of a trip. Moreover, using optional constrained optimization the method may impose natural weight values for the model that represent the energy consumption rate of each road segment. This makes the model more interpretable and makes it easier to understand the predictions made.

This method may overcome the need for acquiring expensive link level data and may also save time, since no pre-processing steps for time series data are required. After predicting the contribution of each road segment to energy consumption, a route optimization algorithm may be applied for energy efficient route calculation.

The same method steps may be applied to forecast PV energy generation or in financial forecasting.

In general, the method predicts the impact of each constituent to an aggregated statistic, whether in the time domain or in the space domain. Therefore, the proposed solution may be applied to many domains in which there is a need to recover the effect of individual variables to an aggregated statistic.

Benefits of Invention Embodiments

The embodiments present a method to estimate weights of road segments for an optimal path finder in graph such as Dijkstra or A* algorithm. In the context of EVs, optimal means more energy efficient.

Embodiments may transform an inaccessible system of equations into a tractable system. This is possible if the components of the aggregated statistic form clusters.

Embodiments may be applied to any problem where there is a need to find the contribution of each individual component to an aggregated statistic. For example, embodiments may allow robust energy consumption estimation for each road segment from aggregated statistics across a trip without the need for link level ground truth value for energy consumption or motor/driver information.

The aggregated data required may be measured by low-cost sensors. This saves time and money for a business:
  Saving processing time because aggregated data are faster to process.
  Saving money because there is no need to acquire expensive detailed data at intermediate points of the aggregated quantity being measured.

Embodiments may be scalable and thus may be used for on-the-fly accurate energy calculation and optionally also route optimization. Only a lookup from a dictionary is required to get the appropriate cluster value for a particular component.

Embodiments have domain transferability, that is, training the model in one region is enough to make inference on any other region. This is due to clustering of predictor space: to obtain energy consumption for another domain the trips are just clustered accordingly (the total number of clusters should be the same) and then the previously trained model is queried on each cluster. No training of the model from scratch is required.

Weights of the model after fit may have a physical meaning after constrained optimization: they represent the energy consumption rate of road segments. This makes it easier to understand and interpret predictions made by Neural Network. Such understanding is useful for example when Neural Networks have to make important decisions (for example in medicine or autonomous driving).

Application Areas

One application area may be as part of energy calculation for a planned journey, for example electric vehicle's Distance to Empty (DTE) or energy efficient route optimization software, which may also predict the most energy efficient route as well as energy consumption and remaining driving range. Embodiments may be used by commercial vehicles to save money by applying energy efficient route estimation as well as by delivery fleet vehicles to minimize cost while completing deliveries on time. Additionally, they may be used by ride sharing companies (shared taxi) in order to optimize pickup locations and maximize profit.

Embodiments may also be used in the scenarios where battery capacity is limited (e.g. second-hand EV with lower battery capacity). Drivers tend to buy EVs with large battery capacity, because of uncertainties of energy consumption during the trip (e.g. due to weather, traffic jams). If those uncertainties are reduced, it is possible for a greater cross-section of drivers to purchase EVs because EVs with smaller battery capacities are less expensive.

Another area to which embodiments may be applied is Vehicle-to-Grid (V2G) in blackout scenarios. With increasing natural disasters (e.g. high wind, flooding, earthquake), affected areas sometimes have secondary impacts due to blackout. EVs may be used as mobile generator in these situations. As an EV uses electricity to move to affected area, it is important to choose most energy-efficient routes for effective usage of EVs as mobile generator.

Embodiments may be purposed for time-series data, rather than spatial data. Time-series suitable embodiments may be applied to, for example, photovoltaic (PV) energy generation estimation or financial forecasting using aggregate statistics.

More generally, the modelling approach may be used for any problem that needs estimation of individual components that contribute to an aggregated statistic.

Hardware Implementation

Figure 14:
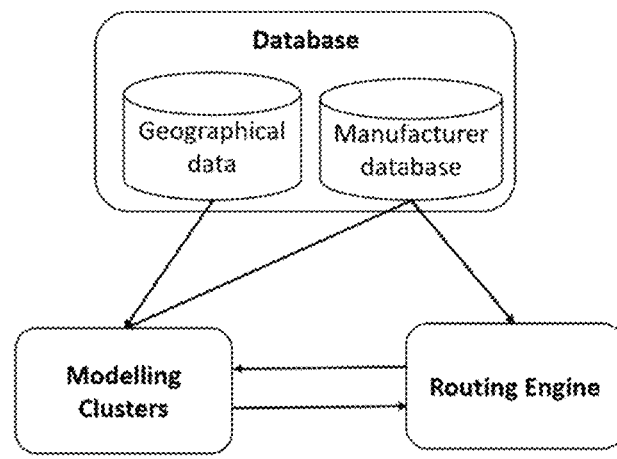
FIG. 14 is an overview of the data used in modelling and in routing according to an embodiment.

FIG. 14 is an overview diagram of how data is used in arrangements. A database with geographical data and manufacturer data services both the cluster modelling (which may be carried out for example on the cloud) and a routing engine for suggesting lower/lowest energy routes (this could use a laptop computer or mobile device and consult the data formed by the modelling. In one example, the user of the routing engine inputs a start and an end point and the routing engine divides the various possible routes between the points into segments and queries a dictionary/look-up table provided by the cluster model to find the rate of energy use for each segment or a total energy use. The routing engine may then compare the different routes to find the most efficient one. Alternatively, the segmentation may take place remotely from the routing engine. The skilled person will appreciate that there are various ways to carry out the method on the cloud, off the cloud or partially locally and partially on the cloud.

For instance, to create the model (and hence the clusters) the method requires geographical data and manufacturer data. This modelling is performed offline and cluster-weights may be stored in a lookup table, as depicted in the arrows connecting the 'Geographical data' unit and the 'Manufacturer database' unit to the 'Modelling clusters' unit in FIG. 14. Moreover, the 'Geographical data' unit may be used on-the-fly when there is real-time traffic data available.

As a pre-processing operation, the method may query the shortest paths between start and end points of each trip and keep trips with no more than 2% deviation from the shortest path. To do so, the method may use the manufacturer data for the trip (start and end longitude and latitude for the trip) and a routing engine, as depicted with the arrow connecting the 'Manufacturer database' unit to the 'Routing Engine' unit in FIG. 14.

Finally, the 'Modelling Clusters' unit and the 'Routing Engine' unit may communicate in two different ways. First, offline dictionaries with mappings of {road segments↔clusters} and {clusters↔weights} are stored in memory. Then, after a user enters a query (start and end point of a trip) on-the-fly, the 'Routing Engine' unit may use the clusters formed by the method to get weights for each road segment in the map and, afterwards, use a shortest graph algorithm (such as Dijkstras or A*) to find the most energy efficient route. Therefore, the 'Routing Engine' unit may first query the database with clusters and weights (arrow from the 'Routing Engine' unit to the 'Modelling Clusters' unit) and then receive information (arrow from the 'Modelling Clusters' unit to the 'Routing Engine' unit) to perform energy efficient route optimization.

Figure 15:
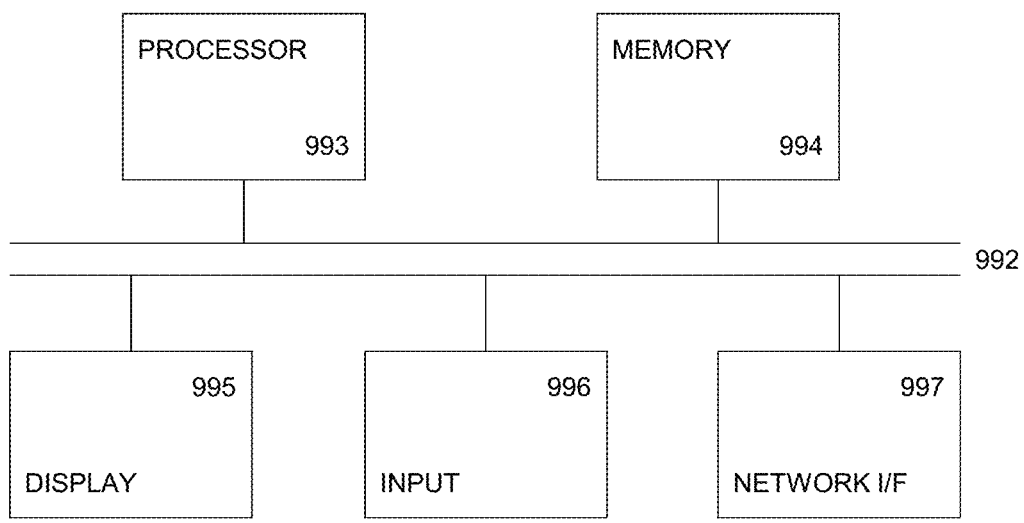
FIG. 15 is a diagram of suitable hardware for implementation of according to an embodiment.

FIG. 15 is a block diagram of a computing device, such as a data storage server, which embodies the present invention, and which may be used to implement a method of an embodiment of predicting energy use for a route as defined in the claims and described in the description, or a method of modelling clusters, and/or a method of finding an energy-optimised route as shown in FIG. 2. It may also be used in other implementations for estimating individual components that contribute to an aggregated statistic as explained herein. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, a term which may refer to a single medium or multiple medium (e.g., a centralized or distributed database and/or associated caches and servers) configured to carry computer-executable instructions or have data structures stored thereon. Computer-executable instructions may include, for example, instructions and data accessible by and causing a general-purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions described here and in the claims. For example, the processor may carry out the steps which match a road segment to a corresponding cluster and thus to a predicted rate of energy use. Additionally or alternatively, the processor may carry out the steps which predict the energy use of a new route by summing the predicted rate of energy use multiplied by the length of the segment for each segment on the route.

The memory 994 stores data being read and written by the processor 993, for example it may include the database referred to herein, or it may simply store parameters such as predictor levels and tables of information, for example as shown in FIGS. 9, 10, 11 and 12. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device. In one example the display may be used to show the model build and the input used for hyperparameters. Additionally or alternatively, the display may show a map with a suggested route and potentially other, less energy-efficient routes and the input may be of a start and end point for a route. In a more general embodiment, the display may show one or more predictions of contribution for aggregated statistics incorporating one or more segments from the K trials.

The network interface (network I/F) 997 may be connected to a network, such as the Internet, and is connectable to other such computing devices via the network, enabling the computing device to access a manufacturer's database or database of K trials in a more general embodiment, for example. The network I/F 997 may control data input/output from/to other apparatus via the network. Other peripheral devices such as microphone, speakers, printer, power supply unit, fan, case, etc. may be included in the computing device.

Methods embodying the present invention may be carried out on a computing device such as that illustrated in FIG. 15. Such a computing device need not have every component illustrated in FIG. 15 and may be composed of a subset of those components. A method embodying the present invention may be carried out by a single computing device in communication with one or more data storage servers via a network. The computing device may be a data storage itself storing of predicted energy use for a route.

A method embodying the present invention may be carried out by a plurality of computing devices operating in cooperation with one another. One or more of the pluralities of computing devices may be a data storage server storing at least a portion of data such as predicted rate of energy use for clusters or predicted energy use for a route.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer-implemented method of predicting energy use for a route comprising:
   inputting map data of roads included in K trips in a geographical area, and inputting predictors of rate of energy use along the roads;
   inputting energy consumption data of the K trips, the energy consumption data indicating total energy use T between a start point A and an end point B of each of the K trips;
   dividing each of the roads in the map data for all the K trips into segments of length measure $\lambda_i$;
   grouping the segments from the K trips into a number N of clusters, the clusters being defined in accordance with ranges of at least one of the predictors of rate of energy use and each cluster being defined as having a weight $W_j$ which is to be determined;
   using an algorithm to build a model predicting the weight $W_j$ based on solving a system of equations, one per trip, each equation equating a known total energy use T of a trip with a sum of a known length measure of each segment in the trip multiplied by a weight for a cluster into which a segment was grouped;
   for each segment, assigning the predicted weight $W_j$ applied to the cluster in which the segment was grouped as a predicted rate of energy use $Y_i$; and
   storing a segment identifier (ID) with an indication of the predicted rate of energy use $Y_i$ to thereby allow determination of a prediction of energy use for the route in the geographical area based on collective processing of one or more segments among the segments grouped into the clusters.

2. The computer-implemented method according to claim 1 further comprising:
   before the inputting of the map data, for each trip in a database, finding a shortest route between the start point A and the end point B; checking a length in the database between start point A and end point B; and including data of the shortest route for a trip when the length is within a threshold of the shortest route between A and B to form the K trips.

3. The computer-implemented method according to claim 1, further comprising:
   executing data cleaning before the inputting of the map data.

4. The computer-implemented method according to claim 3, the data cleaning comprising:
   smoothing elevation data on elevation tiles by, when there is more than one point on a tile, changing an elevation of one or more edge points on the tile adjacent to a tile of a different elevation to move the elevation of the one or more edge points closer to the elevation of the tile of the different elevation.

5. The computer-implemented method according to claim 1, wherein the computer-implemented method is extended to include all the segments in the geographical area by:
dividing parts of the roads in the geographical area which are not included in the K trips into untraveled segments;
grouping any untraveled segment into a cluster in accordance with a level of at least one of the predictors in that untraveled segment; and
using the predicted rate of energy use and length of measure of each untraveled segment to allow prediction of energy use for a route also incorporating one or more of the untraveled segments.

6. The computer-implemented method according to claim 1, wherein the predictors include at least one of: gradients in the segments, such as an average positive or negative gradient of the segment; and traffic-affecting features in the segments, such as historical traffic data, traffic signals, junctions, and shops.

7. The computer-implemented method according to claim 1, wherein
the clusters are defined in accordance with ranges of one or more predictors providing a predictor space of a number of dimensions equal to a number of predictors, the predictor space providing one axis for each predictor, a predictor having a greater effect on the energy use preferably being divided into more cluster divisions than a predictor having a lesser effect on the energy use.

8. The computer-implemented method according to claim 7, further comprising:
for each dimension, ordering the division of the cluster so that a division representing a level of predictor having a lower effect on energy consumption is provided in a lower division and/or at a lower position along the one axis for that predictor than a division representing a level of predictor having a higher effect on energy consumption, and $W_j$ has a lower value than $W_{j+1}$.

9. The computer-implemented method according to claim 1, wherein the geographical area is a qeographical area M, and a number of segments of road in the geographical area M is at least one order of magnitude greater than the number N of clusters and/or a number of trips K.

10. The computer-implemented method according to claim 1, wherein the algorithm to build the model is a quadratic optimization algorithm or developed by a neural network.

11. The computer-implemented method according to claim 10, wherein the algorithm is a quadratic optimization algorithm, which is constrained using constraints for weights, the weights being constrained according to the clusters, and ordered according to an impact that each predictor has on the energy consumption rate.

12. The computer-implemented method for route optimisation, comprising using predicted energy use for possible routes in the geographical area between the start point and the end point as calculated according to the computer-implemented method of claim 1 and indicating to a user relative energy use of the possible routes by indicating a lowest-energy route.

13. A non-transitory computer readable medium having stored therein a computer program comprising instructions which, when the computer program is executed by a computer, cause the computer to carry out a computer-implemented method of predicting energy use for a route, the computer-implemented method comprising:
inputting map data of roads included in K trips in a geographical area, and inputting predictors of rate of energy use along the roads;
inputting energy consumption data of the K trips, the energy consumption data indicating total energy use T between a start point A and an end point B of each of the K trips;
dividing each of the roads in the map data for all the K trips into segments of length measure $\lambda_i$;
grouping the segments from the K trips into a number N of clusters, the clusters being defined in accordance with ranges of at least one of the predictors of rate of energy use and each cluster being defined as having a weight $W_j$ which is to be determined;
using an algorithm to build a model predicting the weight $W_j$ based on solving a system of equations, one per trip, each equation equating a known total energy use T of a trip with a sum of a known length measure of each segment in the trip multiplied by a weight for a cluster into which a segment was grouped;
for each segment, assigning the predicted weight $W_j$ applied to the cluster in which the segment was grouped as a predicted rate of energy use $Y_i$; and
storing a segment identifier (ID) with an indication of the predicted rate of energy use $Y_i$ to thereby allow determination of a prediction of energy use for the route in the geographical area based on collective processing of one or more segments among the segments grouped into the clusters.

14. A data processing apparatus comprising a processor and memory configured to carry out the computer-implemented method of claim 1.

15. A computer-implemented method of estimating individual components that contribute to an aggregated statistic, comprising:
inputting data in K trials, and inputting predictors of overall rate of contribution to the aggregated statistic;
inputting contribution data of the K trials, the contribution data indicating total contribution T between a start and an end of each of the K trials;
dividing each of the K trials into time or space segments of length measure $\lambda_i$;
grouping the segments from the K trials into a number N of clusters, the clusters being defined in accordance with ranges of at least one of the predictors of rate of contribution, each cluster being defined as having a weight $W_j$ which is to be determined;
using an algorithm to build a model predicting the weight $W_j$ based on solving a system of equations, one per trial, each equation equating a known total contribution T of a trial with a sum of a known length measure of each segment in the trial multiplied by the weight for a cluster into which the segment was grouped;
for each segment, assigning the predicted weight applied to the cluster in which the segment was grouped as a predicted rate of contribution $Y_i$; and
storing a segment identifier (ID) with an indication of the predicted rate of energy use $Y_i$ to thereby allow determination of a prediction of contribution for the aggregated statistic based on collective processing of one or more segments among the segments grouped into the clusters.

* * * * *